(12) United States Patent
Kanekawa et al.

(10) Patent No.: US 9,490,732 B2
(45) Date of Patent: Nov. 8, 2016

(54) POWER CONVERSION APPARATUS, ELECTRONIC STEERING SYSTEM, ELECTRIC VEHICLE, ELECTRONIC CONTROL THROTTLE AND POWER BRAKE

(71) Applicant: Hitachi Automotive Systems, Ltd., Hitachinaka-shi, Ibaraki (JP)

(72) Inventors: Nobuyasu Kanekawa, Tokyo (JP); Ryoichi Kobayashi, Hitachinaka (JP); Tomonobu Koseki, Hitachinaka (JP); Tomishige Yatsugi, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 88 days.

(21) Appl. No.: 14/379,669

(22) PCT Filed: Feb. 18, 2013

(86) PCT No.: PCT/JP2013/053792
§ 371 (c)(1),
(2) Date: Aug. 19, 2014

(87) PCT Pub. No.: WO2013/140906
PCT Pub. Date: Sep. 26, 2013

(65) Prior Publication Data
US 2015/0012161 A1  Jan. 8, 2015

(30) Foreign Application Priority Data
Mar. 22, 2012 (JP) .................................. 2012-066246

(51) Int. Cl.
*B62D 5/04* (2006.01)
*H02P 6/14* (2016.01)
(Continued)

(52) U.S. Cl.
CPC ................. *H02P 6/14* (2013.01); *B62D 5/046* (2013.01); *B62D 5/0484* (2013.01); *B62D 5/0487* (2013.01); *H02M 1/32* (2013.01); *H02M 7/53871* (2013.01); *H02P 29/0241* (2016.02)

(58) Field of Classification Search
CPC ........................................................ H02P 6/14
USPC ................. 701/22; 318/400.26, 400.27, 722; 363/123; 361/100
See application file for complete search history.

(56) References Cited

U.S. PATENT DOCUMENTS 5,969,624 A * 10/1999 Sakai ....................... B60K 6/46
180/65.245
2010/0270958 A1* 10/2010 Tsuboi ................. B62D 5/0463
318/400.26

(Continued)

FOREIGN PATENT DOCUMENTS

JP       10-167085 A     6/1998
JP       2005-280615 A   10/2005
(Continued)

*Primary Examiner* — John Q Nguyen
*Assistant Examiner* — Anshul Sood
(74) *Attorney, Agent, or Firm* — Volpe and Koenig, P.C.

(57) ABSTRACT

An object is to prevent the motor from carrying out a regeneration braking operation even if any of phase output lines is short-circuited to VB or GND in addition to a short-circuit failure occurring in a MOSFET of an inverter. The semiconductor switching devices of a power conversion apparatus each have a diode that is coupled in parallel to each of the semiconductor switching devices. At least one of the diodes are connected in a direction opposite to the direction in which other diodes are oriented on a current path between the power supply and the ground. Further, at least one of diodes is connected in a direction opposite to the direction in which other diodes are oriented on a current path between the output of the motor and the power supply and on a current path between the output of the motor and the ground.

16 Claims, 30 Drawing Sheets

(51) Int. Cl.
*H02M 1/32* (2007.01)
*H02M 7/5387* (2007.01)

(56) References Cited

U.S. PATENT DOCUMENTS

2011/0115289 A1   5/2011   Kitamoto
2013/0032438 A1*  2/2013   Koons .................. B60T 8/4054
                                                    188/152

FOREIGN PATENT DOCUMENTS

| JP | 2006-115558 A | 4/2006 |
| JP | 2007-295658 A | 11/2007 |
| JP | 2009-261067 A | 11/2009 |
| JP | 2009-274686 A | 11/2009 |
| JP | 2010-254128 A | 11/2010 |
| JP | 2011-109779 A | 6/2011 |
| WO | 2012/060123 A1 | 5/2012 |

* cited by examiner

| COMPARISON ITEM | | CIRCUIT STRUCTURE | FIG.2 | FIG.8 | FIG.9 |
|---|---|---|---|---|---|
| PHASE CUT OFF | NUMBER OF MOSFET | | 6+4 | 6+6 | 6+6 |
| | NUMBER OF ON-RESISTANCE SERIALLY CONNECTED (RATIO) | AT DRIVING | 5 (125%) | 4 (100%) | 6 (150%) |
| | | AT BACK FLOW | 4 (100%) | 4 (100%) | 6 (150%) |
| PHASE CUT OFF + ALL CURRENTS CUT OFF | STRUCTURE DIAGRAM | | FIG.10 | FIG.15 | FIG.16 |
| | NUMBER OF MOSFET | | 6+4 | 6+7 | 6+8 |
| | NUMBER OF ON-RESISTANCE SERIALLY CONNECTED (RATIO) | AT DRIVING | 5 (125%) | 5 (100%) | 8 (160%) |
| | | AT BACK FLOW | 4 (100%) | 4 (100%) | 6 (150%) |

| COMPARISON ITEM | | CIRCUIT STRUCTURE | FIG.2 | FIG.36 | FIG.9 |
|---|---|---|---|---|---|
| PHASE CUT OFF | NUMBER OF MOSFET | | 4+4 | 4+4 | 4+4 |
| | NUMBER OF ON-RESISTANCE SERIALLY CONNECTED (RATIO) | AT DRIVING | 5 (125%) | 4 (100%) | 6 (150%) |
| | | AT BACK FLOW | 4 (100%) | 4 (100%) | 6 (150%) |
| PHASE CUT OFF + ALL CURRENTS CUT OFF | STRUCTURE DIAGRAM | | FIG.10 | FIG.37 | FIG.16 |
| | NUMBER OF MOSFET | | 4+5 | 4+5 | 4+6 |
| | NUMBER OF ON-RESISTANCE SERIALLY CONNECTED (RATIO) | AT DRIVING | 6 (125%) | 5 (100%) | 8 (160%) |
| | | AT BACK FLOW | 4 (100%) | 4 (100%) | 6 (150%) |

POWER CONVERSION APPARATUS, ELECTRONIC STEERING SYSTEM, ELECTRIC VEHICLE, ELECTRONIC CONTROL THROTTLE AND POWER BRAKE

TECHNICAL FIELD

The present invention relates to a power conversion apparatus for converting power, which is supplied by a power supply, with the use of semiconductor switching devices.

BACKGROUND ART

With progress in control automation, there is an increasing demand for safety and reliability in an electronic control apparatus. In order to ensure the safety of the electronic control apparatus, it has been required to detect an abnormality immediately after the abnormality is generated and to stop operations. A relay is used in many cases for detaching the apparatus in the event of an abnormality. For example, a main power supply may be cut with a relay in the event of an abnormality. In a motor driving apparatus (particularly, in an electronic steering system), a driving current output to a motor (a phase output) may be cut off by use of a relay in the event of an abnormality.

At the same time, an attempt has been in progress for the sake of higher reliability, longer life, downsizing, and speeding up of protective operations by replacing the relay with a semiconductor device.

Patent document 1 given below discloses a technology for detaching a motor and an inverter from each other. In accordance with the technology, a MOSFET (Metal-Oxide-Semiconductor Field-Advantage Transistor) is inserted into the phase output of a power converter in an electronic steering system. Then, by turning off the MOSFET in the event of an abnormality, the motor and the inverter are detached from each other.

FIG. 4 of patent document 2 given below shows a technology in which two MOSFETs are provided at a location between a power supply and a power converter in such a way that the diode orientations are placed in directions opposite to each other. (To put it concretely, the flowing directions of currents are directions which are outward to each other). With the MOSFETs used as a relay, even if the MOSFETs are put in a power OFF state, parasitic diodes of the MOSFETs cause currents to flow. Thus, in patent document 2, the two MOSFETs are connected to each other in series in such a way that the orientations of the parasitic diodes are put in directions opposite to each other. (To put it concretely, the flowing directions of the currents are directions which are outward or inward to each other).

(FIG. 2 of) patent document 3 given below shows a technology in which a charge-pump power supply is cut off with a relay to reliably power off a MOSFET.

PRIOR ART DOCUMENT

Patent Documents

Patent Document 1: JP-2009-274686-A
Patent Document 2: JP-Hei10-167085-A
Patent Document 3: JP-2011-109779-A

SUMMARY OF THE INVENTION

Problems to be Solved by the Invention

In the technology described in patent document 1, the phase output of the power converter is cut off with the use of semiconductor devices so that, in the event of an abnormality such as a short-circuit failure of a MOSFET included in an inverter, a motor is detached from the inverter in order to avoid a dangerous behavior by stopping an operation to drive the motor. However, there are required more considerations for a case in which the phase output line is short-circuited to GND.

With the MOSFETs used as a relay, parasitic diodes cause currents to flow even if the MOSFETs are put in a power OFF state. Thus, when any of the phase output lines are short-circuited to GND from MOSFETs 7 to 9 of patent document 1, in the remaining 2 phases not short-circuited to GND, a current path (a closed circuit) to a ground short-circuit point is created by way of a motor winding from any of FET4→FET7, FET5→FET8 and FET6→FET9. That is to say, in accordance with this current path, a regeneration braking current of the motor flows, putting the motor in a regeneration braking operation so that a steering by a manual operation can be significantly avoided. It is to be noted that, even if the orientations of the FETs 7 to 9 inserted into the phase output lines are reversed, there is no change in the generation of the same phenomenon provided that any of the phase output lines are short-circuited to VB.

In the technology described in patent document 2, there is raised the same problem when the same ground connection failure such as the one described above occurs. As described in patent document 3, the power supply may be conceivably cut off with the use of a mechanical relay. The provision of the mechanical relay, however, could bring about problems in the viewpoints of higher reliability, longer life, downsizing, and speeding up of the protection operations.

It is an object of the present invention, which has been devised in consideration of the problems described above, not to leave the motor be subjected to a regeneration braking operation even when any of the phase output lines are short-circuited to GND and/or VB in addition to a short-circuit failure in a MOSFET of an inverter.

Means for Solving the Problems

In accordance with the present invention, there is provided a power conversion apparatus for converting power supplied by a power supply into a current for driving a motor with the use of a plurality of semiconductor switching devices. The semiconductor switching devices each have a diode coupled in parallel to each of the semiconductor switching devices. At least one of the diodes is connected in a direction opposite to the direction in which other diodes are oriented on a current path between the power supply and the ground. Moreover, at least one of the diodes is coupled in a direction opposite to the direction in which other diodes are oriented on a current path between the motor winding and the power supply and on a current path between the phase output of the motor and the ground.

Advantages

In accordance with the power conversion apparatus provided by the present invention, it is possible to improve the performance by replacing a mechanical relay with a semiconductor device and improve the safety against a short-circuit failure.

MODE FOR CARRYING OUT THE INVENTION

First Embodiment

Figure 1:
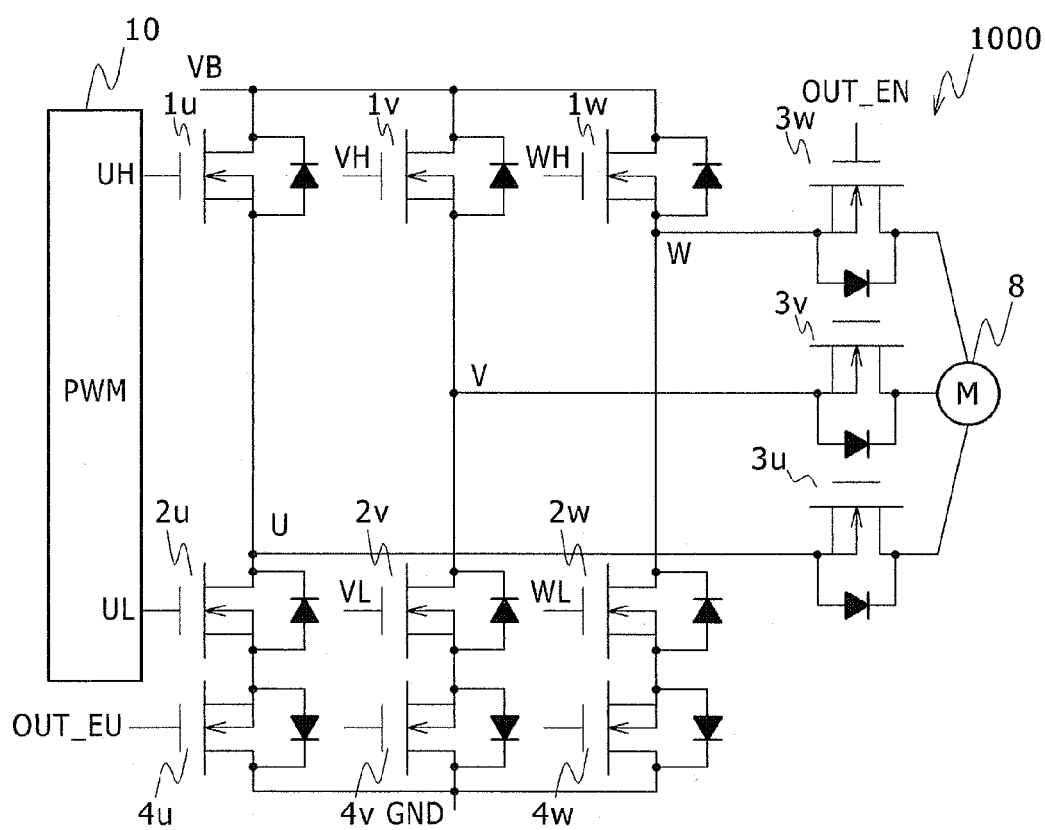
FIG. 1 is a circuit diagram showing a power conversion apparatus 1000 according to a first embodiment.

FIG. 1 is a circuit diagram showing a power conversion apparatus 1000 according to a first embodiment of the present invention. The power conversion apparatus 1000 is an apparatus for converting power supplied by a power supply into a current for driving a motor 8. The power conversion apparatus 1000 includes a first group of MOSFETs 1u to 1w, a second group of MOSFETs 2u to 2w, third group of MOSFETs 3u to 3w, and a fourth group of MOSFETs 4u to 4w.

The first group of MOSFETs 1u to 1w is a group of semiconductor switching devices included in the upper arm of a three-phase inverter. Suffixes u to w correspond to the U phase to the W phase of the motor, respectively. In the following explanation, the suffixes mean the same as well.

The second group of MOSFETs 2u to 2w is a group of semiconductor switching devices included in the lower arm of the three-phase inverter.

The third group of MOSFETs 3u to 3w is connected between the phase output of the power conversion apparatus 1000 and the phase output of the motor 8. Diodes coupled in parallel to the third group MOSFETs 3u to 3w are oriented in a direction of supplying a current to the motor 8.

The fourth-group MOSFETs 4u to 4w of are connected between the phase output of the power conversion apparatus 1000 and the ground in series with the second-group MOSFETs 2u to 2w, respectively. Diodes coupled in parallel to the fourth-group MOSFETs 4u to 4w are oriented in a direction of supplying a current to the ground.

The above-mentioned MOSFETs are provided in such a way that no current path is created between: the power supply and the ground; the phase output of the motor 8 and the power supply; and the phase output of the motor 8 and the ground. This will be explained more later with reference to FIG. 4.

In the following description, if a MOSFET is provided for each phase in every MOSFET group, a suffix showing the phase corresponding to the suffix will be appended to the group number. If a MOSFET is provided not for each phase but only one MOSFET is used, on the other hand, the suffix will be omitted.

Figure 2:
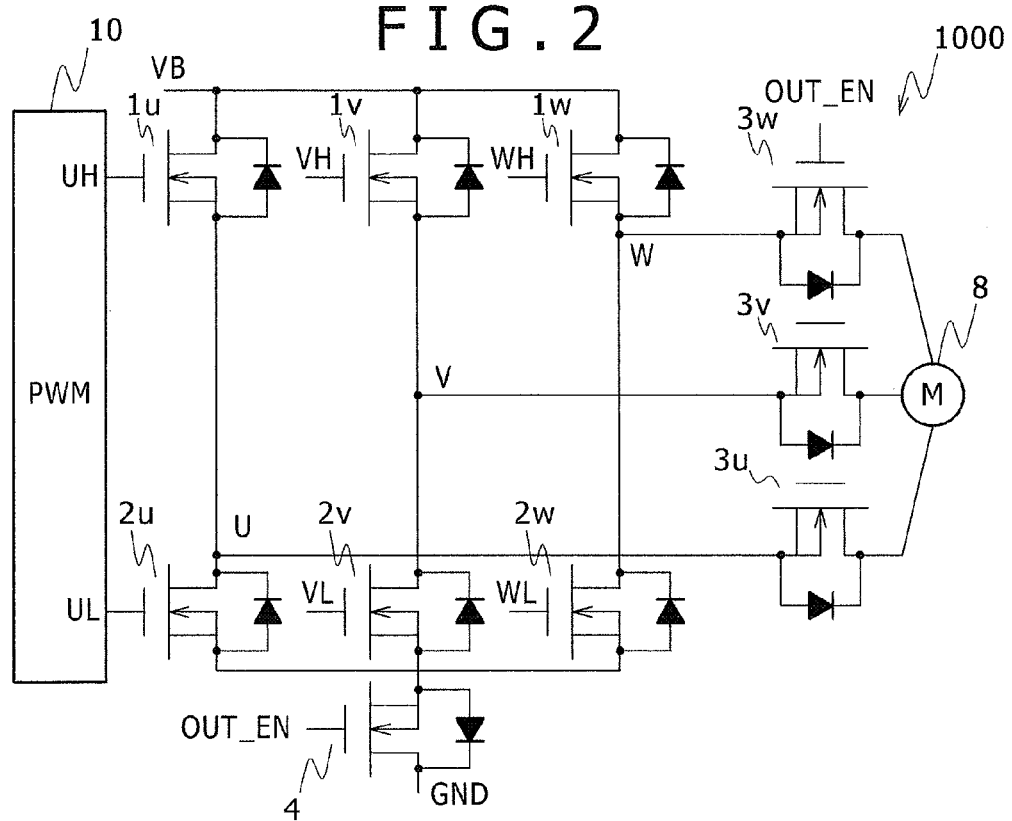
FIG. 2 is a diagram showing a modified version of the embodiment shown in FIG. 1.

FIG. 2 is a diagram showing a modified version of the embodiment shown in FIG. 1. As shown in FIG. 1, when the fourth-group MOSFETs 4u to 4w are provided in front of locations at which the phase outputs of the power conversion apparatus 1000 merge, it is necessary to provide a MOSFET for each phase in order to cut off all the current paths. As shown in FIG. 2, when the fourth-group MOSFETs 4u to 4w are provided behind the locations at which the phase outputs of the power conversion apparatus 1000 merge, on the other hand, it is necessary to provide only one fourth-group MOSFET 4 in order to cut off all the current paths. In addition, a current flowing from the motor 8 does not have to pass through the fourth-group MOSFET 4, so that the number of MOSFETs through which a current flows is reduced by two from that of the structure shown in FIG. 1. Thus, the on-resistance is also decreased by an amount according to the number of MOSFET reduced. As a result, the loss can be kept at a minimum.

The first-group MOSFETs 1u to 1w and the second-group MOSFETs 2u to 2w are controlled with a PWM timer 10. In order to prevent the figure from becoming complicated, the figure shows only a wiring line of a control signal UH supplied from the PWM timer 10 to the gate of the first-group MOSFET 1u, a wiring line of a control signal UL supplied from the PWM timer 10 to the gate of the second-group MOSFET 2u, and a wiring line of a control signal OUT_EN supplied from the PWM timer 10 to the gate of the fourth-group MOSFET 4u. That is to say, the figure does not show wiring lines of control signals VH and WH supplied from the PWM timer 10 to the gates of the first-group MOSFETs 1v and 1w, wiring lines of control signals VL and WL supplied from the PWM timer 10 to the gates of the second-group MOSFETs 2v and 2w, and wiring lines of control signals OUT_EN supplied from the PWM timer 10 to the gates of the third-group MOSFETs 3u to 3v and the fourth-group MOSFETs 4v and 4w. On the top of that, in actuality, the gate terminals of the MOSFET groups are not directly driven by the outputs of the PWM timer 10. Instead, in general, a pre-driver operated by a voltage boosting power supply generates a sufficient voltage between the gate and the source to drive the gate. Also in order to prevent the figure from becoming complicated in the same way, the figure does not show them. This also applies to embodiments explained in the following description.

Figure 3:
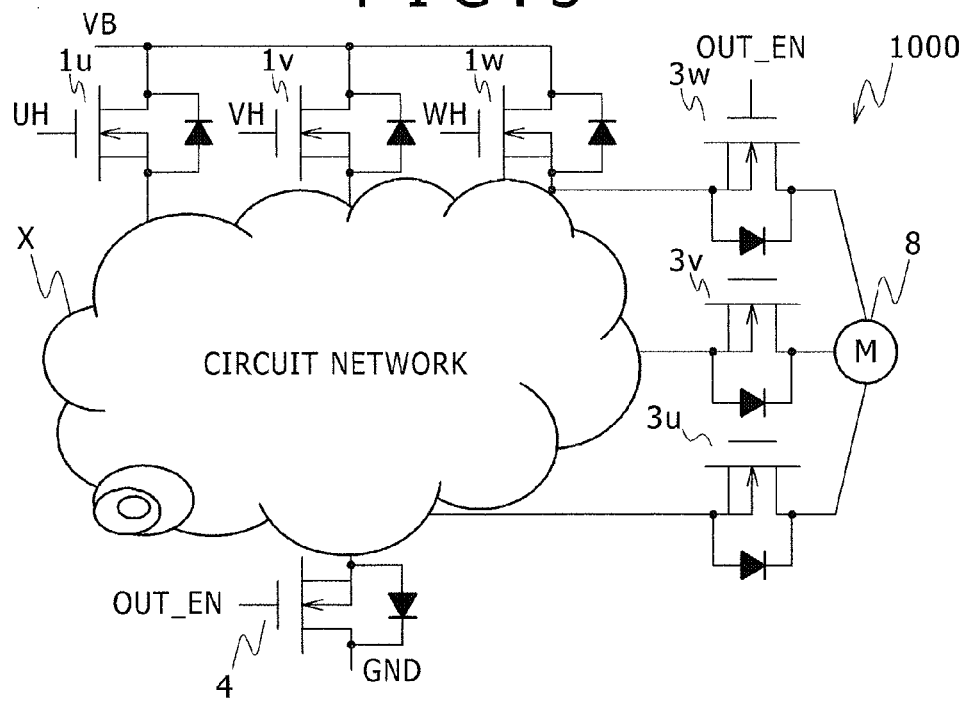
FIG. 3 is a diagram showing a three-phase inverter of the circuit shown in the diagram of FIG. 2 by simplifying a portion of the inverter into a circuit network X.

FIG. 3 is a diagram showing a three-phase inverter of the circuit shown in the diagram of FIG. 2 by simplifying a portion of the inverter into a circuit network X. As shown in FIG. 3, the orientation of parasitic diodes of the first-group MOSFETs 1u to 1w, the orientation of parasitic diodes of the third-group MOSFETs 3u to 3w and the orientation of parasitic diodes of the fourth-group MOSFETs 4u to 4w are made uniform with respect to the circuit network X. Thus, it is possible to display the following advantages. The reader can easily understand that the same advantages can also be exhibited in the structure shown in FIG. 1.

First Advantage of the Structure Shown in FIG. 3

As long as the circuit network X operates normally, a normal operation can be carried out.

Second Advantage of the Structure Shown in FIG. 3

Even if a short-circuit failure occurs in the circuit network X surrounded by the first-group MOSFETs 1u to 1w, the third-group MOSFETs 3u to 3w and the fourth-group MOSFET 4, since only the path of a current flowing to the circuit network X or the path of a current flowing from the circuit network X exists, (that is, since both the paths do not coexist), a parasitic diode does not form a current path connecting a power supply VB to the ground.

Third Advantage of the Structure Shown in FIG. 3

Even if a short-circuit failure occurs in the circuit network X, a current path connecting the power supply VB to the phase output and on a current path connecting the ground GND to the phase output are not formed.

Fourth Advantage of the Structure Shown in FIG. 3

Even if the phase output is short-circuited to the VB in a short circuit to VB failure or short-circuited to GND in a ground short-circuit failure, a closed circuit made to communicate with the motor 8 through the power supply VB or the ground GND is not formed.

Figure 4:
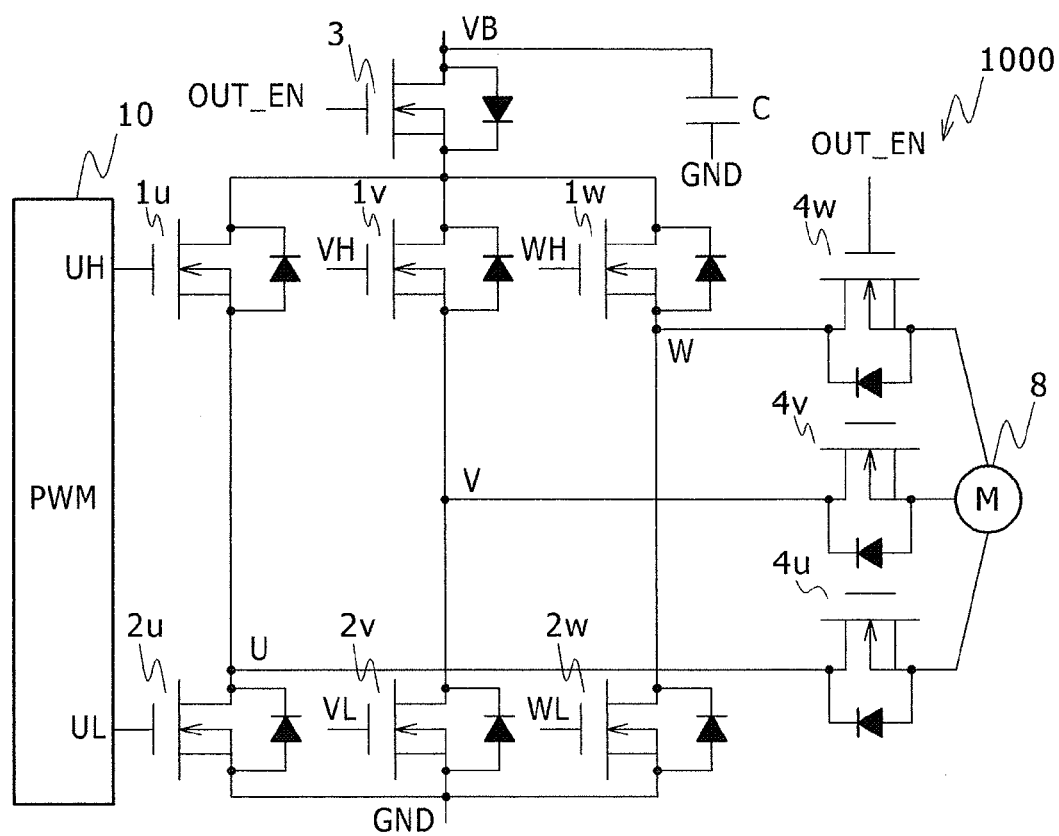
FIG. 4 is a diagram showing a modified version obtained by placing the orientation of a diode provided externally to the circuit network X in a direction opposite to the direction shown in FIG. 2.

FIG. 4 is a diagram showing a modified version obtained by placing the orientation of a diode provided externally to the circuit network X in a direction opposite to the direction shown in FIG. 2. In the structure shown in FIG. 4, a third-group MOSFET 3 is provided between each phase output of the power conversion apparatus 1000 and the power supply VB whereas a parasitic diode is connected in a direction in which a current flows from the power supply VB to the motor 8 (that is, a direction to the circuit network X). In addition, the fourth-group MOSFETs 4u to 4w are provided between the respective phase outputs of the power conversion apparatus 1000 and the respective phase outputs of the motor 8 whereas parasitic diodes are connected in a direction in which a current flows from the motor 8 to the circuit network X.

If the third-group MOSFETs 3 are provided in front of locations at which the phase outputs of the power conversion apparatus 1000 merge (that is, on the circuit side relative to the merging sections), it is necessary to provide 3 MOSFETs, that is, the third-group MOSFETs 3u to 3w in the same way as the structure shown in FIG. 2. As shown in FIG. 4, an advantage when only one third-group MOSFET is provided is the same as that of the fourth-group MOSFET 4 shown in FIG. 2.

In accordance with the circuit structure shown in FIG. 4, at a normal time, the third MOSFET 3 and the fourth-group MOSFETs 4u to 4w are powered on, making it possible to provide a normal motor driving operation with the use of the first-group MOSFETs 1u to 1w and the second-group MOSFETs 2u to 2w. In addition, in the event of an abnormality, the third MOSFET 3 and the fourth-group MOSFETs 4*u* to 4*w* are powered off, making it possible to provide the same advantage as with the structure shown in FIG. 3.

Figure 5:
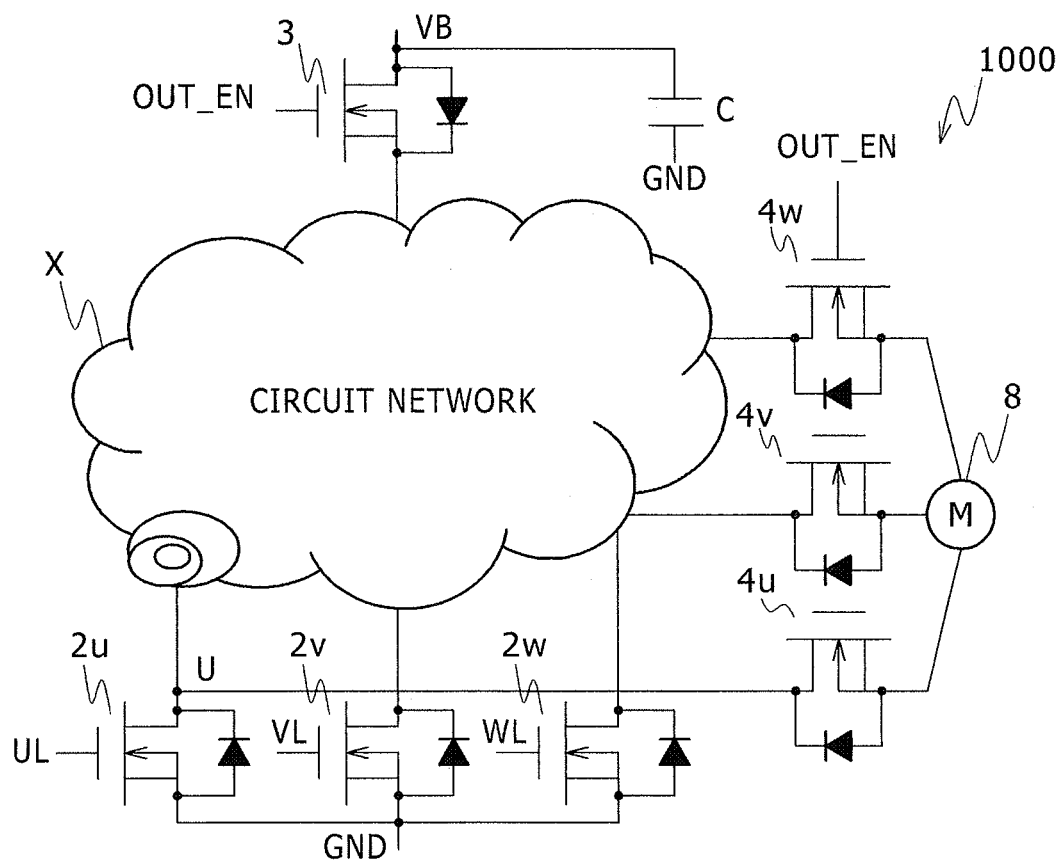
FIG. 5 is a diagram showing a three-phase inverter of the circuit shown in the diagram of FIG. 4 by simplifying a portion of the inverter into a circuit network X.

FIG. 5 is a diagram showing a three-phase inverter of the circuit shown in the diagram of FIG. 4 by simplifying a portion of the inverter into a circuit network X. As shown in FIG. 5, the orientation of parasitic diodes of the second-group MOSFETs 2*u* to 2*w*, the orientation of a parasitic diode of the third-group MOSFET 3, and the orientation of parasitic diodes of the fourth-group MOSFETs 4*u* to 4*w* are made uniform with respect to the circuit network X. Thus, it is possible to display the following advantages.

First Advantage of the Structure Shown in FIG. 5

It is possible to exhibit the same advantage as the first, third, and fourth advantages of the structure shown in FIG. 3.

Second Advantage of the Structure Shown in FIG. 5

Even if a short-circuit failure occurs in the circuit network X surrounded by the second-group MOSFETs 2*u* to 2*w*, the fourth-group MOSFETs 4*u* to 4*w*, and the third-group MOSFET 3, since only the path of a current flowing to the circuit network X or the path of a current flowing from the circuit network X exists, (that is, since both the paths do not coexist), a parasitic diode does not form a current path connecting the power supply VB to the ground GND.

In the circuit structure shown in FIG. 4, it is also possible to add a capacitor C for reducing the impedance of the power supply VB. In this case, it is desirable to insert the capacitor C between a terminal on the power-supply-VB side of the third-group MOSFET 3 and the GND as shown in FIG. 4. If the capacitor C is inserted between a terminal on the three-phase-inverter side of the third-group MOSFET 3 and the GND, a charging current inevitably flows from the motor 8 to the capacitor C by way of the parasitic diode, such that the advantage of the present invention is undesirably lost because the motor 8 carries out a regeneration braking operation.

It is also possible to add a capacitor C between a terminal on the ground side of the fourth-group MOSFET 4 and the power supply VB in the circuit structure shown in FIG. 2 as the same manner above. For the same reason as the structure shown in FIG. 4, it is not desirable to insert the capacitor C between a terminal on the three-phase-inverter side of the fourth-group MOSFET 4 and the power supply VB.

Figure 6:
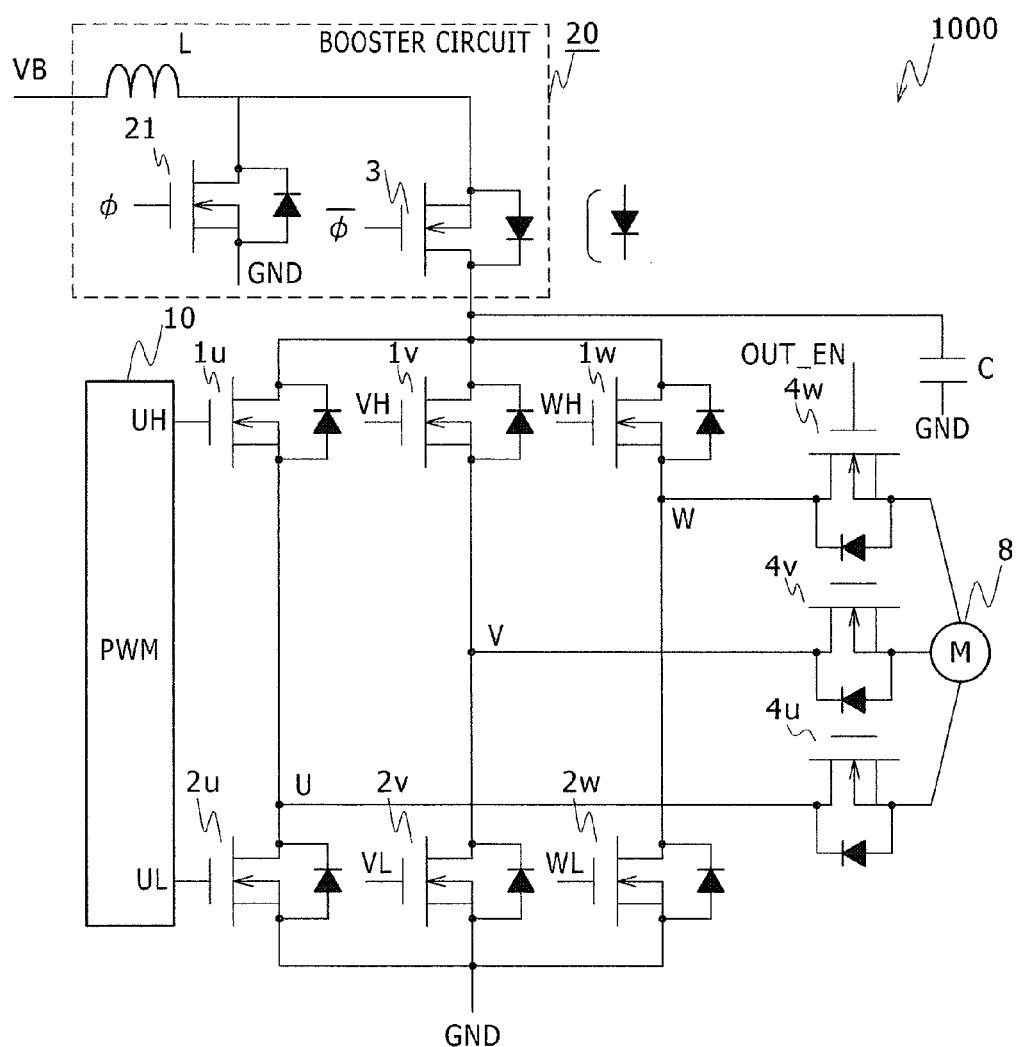
FIG. 6 is a diagram showing the structure of a circuit using a third-group MOSFET 3 shown in FIG. 5 also as a structural element of a booster circuit 20.

FIG. 6 is a diagram showing the structure of a circuit using a third-group MOSFET 3 shown in FIG. 5 also as a structural element of a booster circuit 20. It is to be noted that, in place of the third-group MOSFET 3, it is also possible to use a diode D as shown in FIG. 6.

The operation of the booster circuit 20 will first be explained. With a MOSFET 21 powered on, a current is flowing through a coil L. When the MOSFET 21 is powered off, a voltage v (=L*di/dt) is added to the voltage VB so that a voltage higher than the voltage VB is generated at the drain terminal of the MOSFET 21. At this time, the voltage generated at the drain terminal of the MOSFET 21 is stored in a capacitor C through the parasitic diode of the third-group MOSFET 3 or the diode D. By powering on and off the MOSFET 21 repeatedly as described above, a voltage higher than the voltage VB can be stored in the capacitor C. Moreover, when the MOSFET 21 is powered off, the third-group MOSFET 3 is powered on in order to reduce a forward-direction voltage effect, thereby improving the conversion efficiency.

Furthermore, in the same way as the structure shown in FIG. 5, a closed circuit connected to the motor 8 through the power supply VB or the ground will not be formed as long as the third-group MOSFET 3 has been powered on even if the phase output is short-circuited to the VB or GND.

Figure 7:
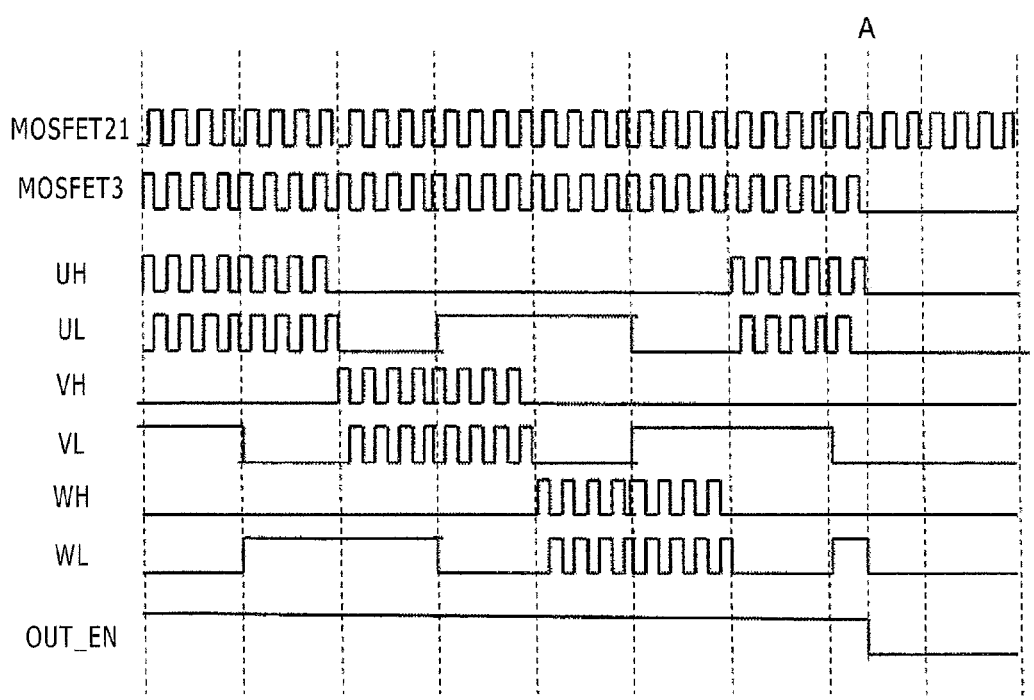
FIG. 7 is time charts of operations carried out in the circuit shown in FIG. 6.

FIG. 7 is time charts of operations carried out in the circuit shown in FIG. 6. It is assumed that, at a time A in the time charts shown in FIG. 7, an abnormality such as a short circuit to VB or to GND is generated and, thereafter, an operation is carried out to prevent the motor 8 from performing a regeneration braking operation.

Prior to the time A, the MOSFET 21 and the third-group MOSFET 3 are repeatedly powered on and off alternately in order to boost the power supply VB and store electric charge in the capacitor C. After the time A at which an abnormality is generated, it is desirable to continue the operation of the MOSFET 21 and power off the third-group MOSFET 3.

The reason the third-group MOSFET 3 should desirably be powered off is to prevent the motor 8 from carrying out a regeneration braking operation. This operation is restrained as a result that a current flows to the VB side through the third-group MOSFET 3 after the regeneration voltage generated by the motor 8 exceeds a voltage generated by the MOSFET 21 and the coil L when a short circuit to VB failure occurs in the phase output. It is desirable to continue the operation of the MOSFET 21 in order to prevent the motor 8 from carrying out a regeneration braking operation. Continuing the operation to boost the voltage of the capacitor C makes a regeneration current from the motor 8 flow into the capacitor C. The operation is restrained as a result. In such a case, however, it is still possible to keep applying a boosted voltage to the capacitor C through a diode coupled in parallel to the third-group MOSFET 3 even when the third-group MOSFET 3 is powered off.

The operations to drive phases are stopped after the time A, which is shown in FIG. 7. It is needless to say that OUT_EN be turned off.

In a structure like the one shown in FIG. 6, the third-group MOSFET 3 is used also as a structural element of the booster circuit 20. When the parasitic diode of the structural element is connected in a direction in which a current flows from the motor 8 to the three-phase inverter as shown in FIG. 5, an advantageous effect is exhibited under a minus ground circuit system. When the parasitic diode of the structural element is connected in a direction in which a current flows to the motor 8 as shown in FIGS. 2 and 3, on the other hand, it is necessary to adopt a plus ground circuit system which is not a very popular system adopted at the present day since the fourth-group MOSFET 4 has to be provided on the ground side (the minus side) of the three-phase inverter.

First Embodiment

Conclusions

As described above, in the power conversion apparatus 1000 according to the first embodiment, semiconductor switching devices are connected in such a way that diodes coupled in parallel to the semiconductor switching devices do not form a current path between the VB and the GND, a current path between the respective phase outputs of the motor 8 and the VB, and on a current path between the respective phase outputs of the motor 8 and the GND. Thus, even if a short-circuit failure occurs in the circuit network X, the safety of the circuit can be maintained.

Second Embodiment

Figure 8:
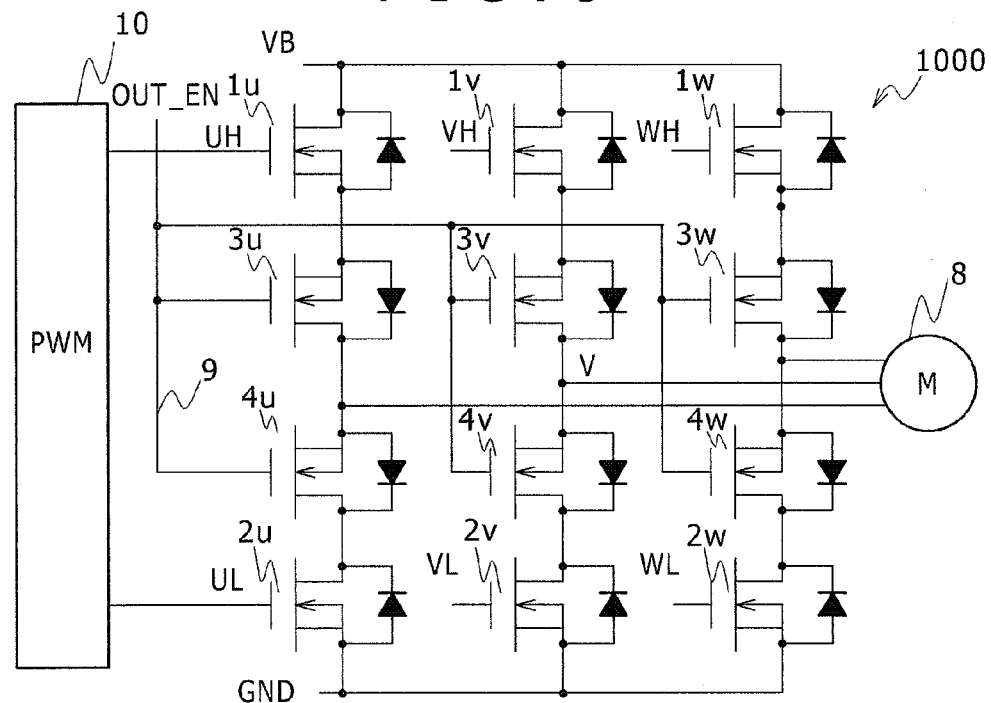
FIG. 8 is a circuit diagram showing the power conversion apparatus 1000 according to a second embodiment.

FIG. 8 is a circuit diagram showing the power conversion apparatus 1000 according to a second embodiment of the present invention. In the structure shown in FIG. 8, the third-group MOSFETs 3u to 3w are connected in series with the first-group MOSFETs 1u to 1w, respectively, between the respective phase outputs of the power conversion apparatus 1000 and the power supply in such a way that their parasitic diodes are oriented in an opposite direction. In addition, the fourth-group MOSFETs 4u to 4w are connected in series with the second-group MOSFETs 2u to 2w, respectively, between the respective phase outputs of the power conversion apparatus 1000 and the ground in such a way that their parasitic diodes are oriented in an opposite direction.

At a normal time, the third-group MOSFETs 3u to 3w and the fourth-group MOSFETs 4u to 4w can be powered on while the first-group MOSFETs 1u to 1w and the second-group MOSFETs 2u to 2w can be used to implement a normal motor driving operation. In the event of an abnormality, the third-group MOSFETs 3u to 3w and the fourth-group MOSFETs 4u to 4w are powered off in order to prevent a short-circuit closed circuit explained earlier in the description of the first embodiment from being formed by the parasite diodes. Thus, the three-phase inverter can be detached from the motor 8.

Third Embodiment

Figure 9:
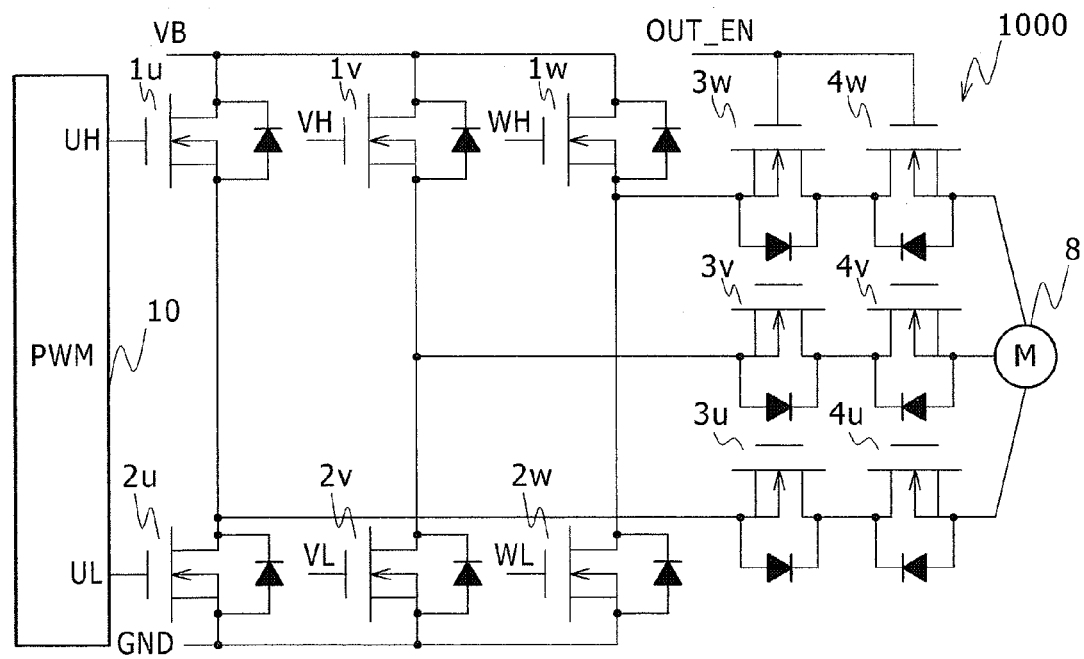
FIG. 9 is a circuit diagram showing the power conversion apparatus 1000 according to a third embodiment.

FIG. 9 is a circuit diagram showing the power conversion apparatus 1000 according to a third embodiment. In the structure shown in FIG. 9, the third-group MOSFETs 3u to 3w are connected in series with the fourth-group MOSFETs 4u to 4w, respectively, between the respective phase outputs of the power conversion apparatus 1000 and the respective phase outputs of the motor 8. The third-group MOSFETs 3u to 3w and the fourth-group MOSFETs 4u to 4w are provided in such a way that the parasite diodes of the third-group MOSFETs 3u to 3w are oriented in a direction opposite to that of the fourth-group MOSFETs 4u to 4w.

The first-group MOSFETs 1u to 1w and the second-group MOSFETs 2u to 2w are used to implement a normal motor driving operation. The third-group MOSFETs 3u to 3w and the fourth-group MOSFETs 4u to 4w are controlled by a signal line OUT_EN. At a normal time, the third-group MOSFETs 3u to 3w and the fourth-group MOSFETs 4u to 4w are powered on. In the event of an abnormality, on the other hand, the third-group MOSFETs 3u to 3w and the fourth-group MOSFETs 4u to 4w are powered off. The third-group MOSFETs 3u to 3w and the fourth-group MOSFETs 4u to 4w are powered on at a normal time. Thus, the first-group MOSFETs 1u to 1w and the second-group MOSFETs 2u to 2w can be used to implement a normal motor driving operation. In the event of an abnormality, on the other hand, the third-group MOSFETs 3u to 3w and the fourth-group MOSFETs 4u to 4w are powered off, so that the three-phase inverter can be detached from the motor 8 without the parasite diodes forming a short-circuit closed circuit explained earlier in the description of the first embodiment.

In place of the third-group MOSFETs 3u to 3w and the fourth-group MOSFETs 4u to 4w, other series circuits can be connected between the respective phase outputs of the power conversion apparatus 1000 and the respective phase outputs of the motor 8, the series circuits being coupled in parallel to devices in an opposite direction, the device not having a parasitic diode. Examples of such a device are a thyristor, an IGBT, and a bipolar transistor.

For an apparatus having an operating power-supply voltage in a range of 12 to 36V, a voltage drop caused by a semiconductor device cannot be ignored when compared with the operating power-supply voltage. Thus, in many cases, a MOSFET is used as a semiconductor device, the MOSFET having a small voltage drop as in FIG. 1. Other devices having no parasitic diode can be employed too, the devices including thyristor, an IGBT, and a bipolar transistor. In the case of the use of those devices, however, a voltage drop of about 7V is undesirably generated.

A voltage drop of the same order is eventually generated whenever the MOSFETs having opposite directions are connected in series as shown in FIG. 9. Thus, even when other devices such as a thyristor, an IGBT, and a bipolar transistor are used, it is still possible to provide an advantage virtually equivalent to that of the structure shown in FIG. 9.

Fourth Embodiment

Figure 10:
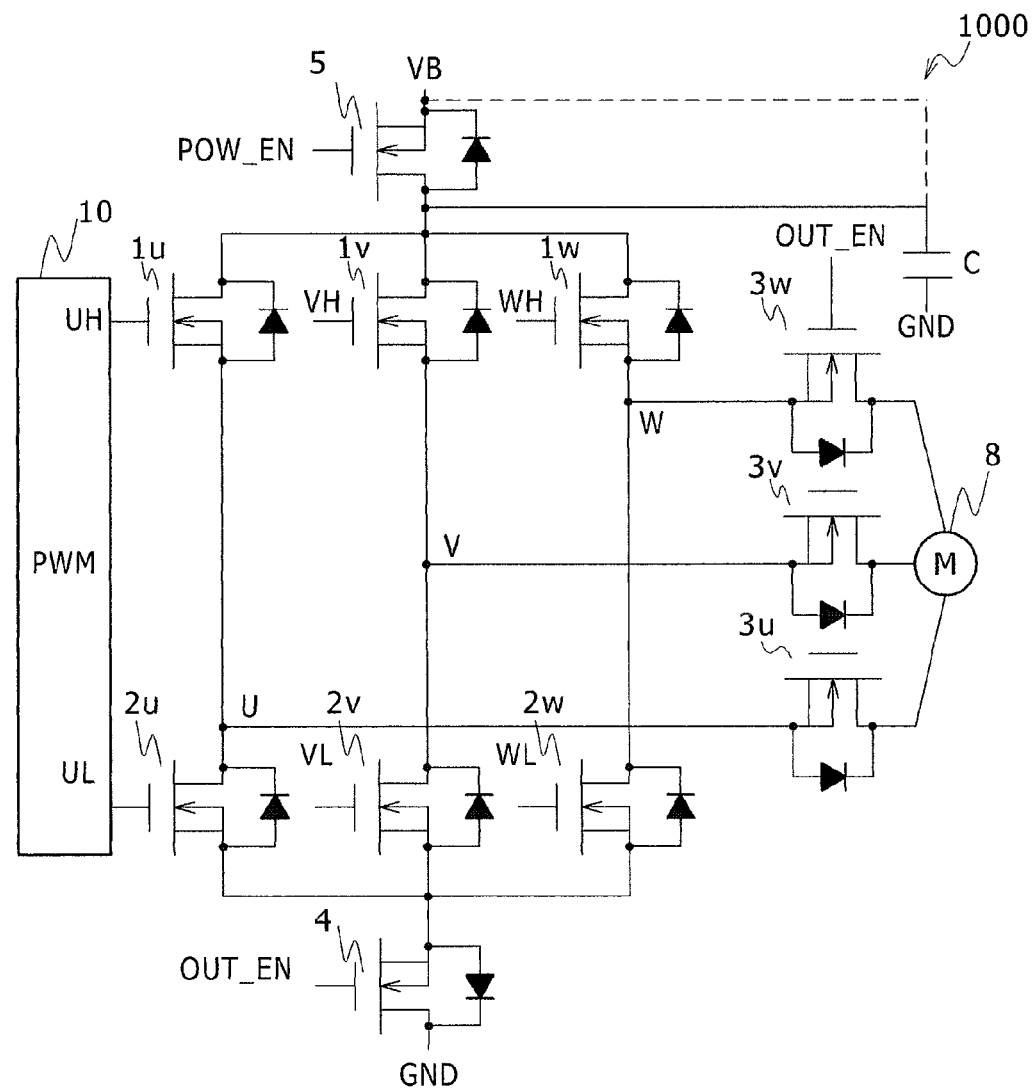
FIG. 10 is a diagram showing the structure of a circuit including an additional fifth-group MOSFET 5 for cutting off all currents in addition to the circuit structure shown in FIG. 2.

FIG. 10 is a diagram showing the structure of a circuit including an additional fifth-group MOSFET 5 for cutting off all currents in addition to the circuit structure shown in FIG. 2. An operation to cut off all currents means an operation to cut off all currents flowing from the power supply VB to the power conversion apparatus 1000. A fifth-group MOSFET 5 is provided in FIG. 10 in consideration of the direction of the fourth-group MOSFET 4.

Figure 11:
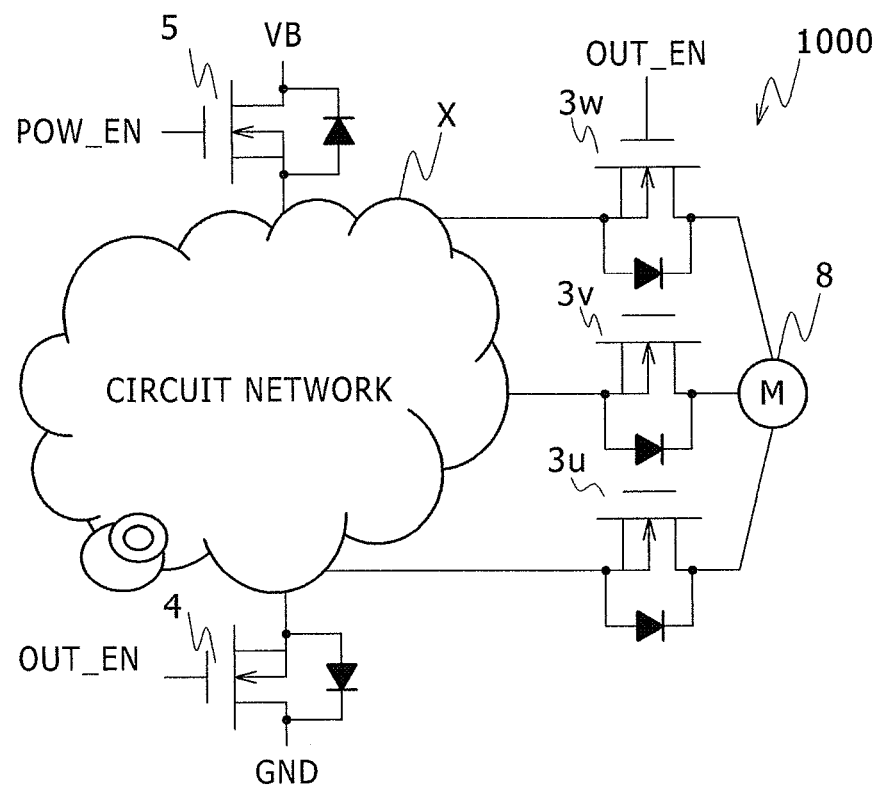
FIG. 11 is a diagram showing a three-phase inverter of the circuit shown in the diagram of FIG. 10 by simplifying a portion of the inverter into a circuit network X.

FIG. 11 is a diagram showing a three-phase inverter of the circuit shown in the diagram of FIG. 10 by simplifying a portion of the inverter into a circuit network X. As shown in FIG. 11, the orientation of parasitic diodes of the third-group MOSFETs 3u to 3w, the orientation of a parasitic diode of the fourth-group MOSFET 4, and the orientation of a parasitic diode of the fifth-group MOSFET 5 are made uniform with respect to the circuit network X. Thus, the following advantages can be exhibited.

First Advantages of the Structure Shown in FIG. 11

It is possible to exhibit the same advantages as the first, third, and fourth advantages of the structure shown in FIG. 3.

Second Advantages of the Structure Shown in FIG. 11

Even if a short-circuit failure occurs in the circuit network X surrounded by the third-group MOSFETs 3u to 3w, the fourth-group MOSFET 4, and the fifth-group MOSFET 5, since only the path of a current flowing to the circuit network X or the path of a current flowing from the circuit network X exists, (that is, since both the paths do not coexist), a parasitic diode does not form a current path connecting the power supply VB to the ground GND.

The third-group MOSFETs 3u to 3w, the fourth-group MOSFET 4 and the fifth-group MOSFET 5 are powered on at a normal time. Thus, the first-group MOSFETs 1u to 1w and the second-group MOSFETs 2u to 2w can be used to implement a normal motor driving operation. In the event of an abnormality, on the other hand, the third-group MOSFETs to 3w, the fourth-group MOSFET 4 and the fifth-group MOSFET 5 are powered off, so that the three-phase inverter can be detached from the motor 8 without the parasite diodes forming a short-circuit closed circuit explained earlier in the description of the first embodiment. That is to say, by merely increasing the on-resistance of one semiconductor device, the power supply (all currents) can be cut off in the event of an abnormality.

Figure 12:
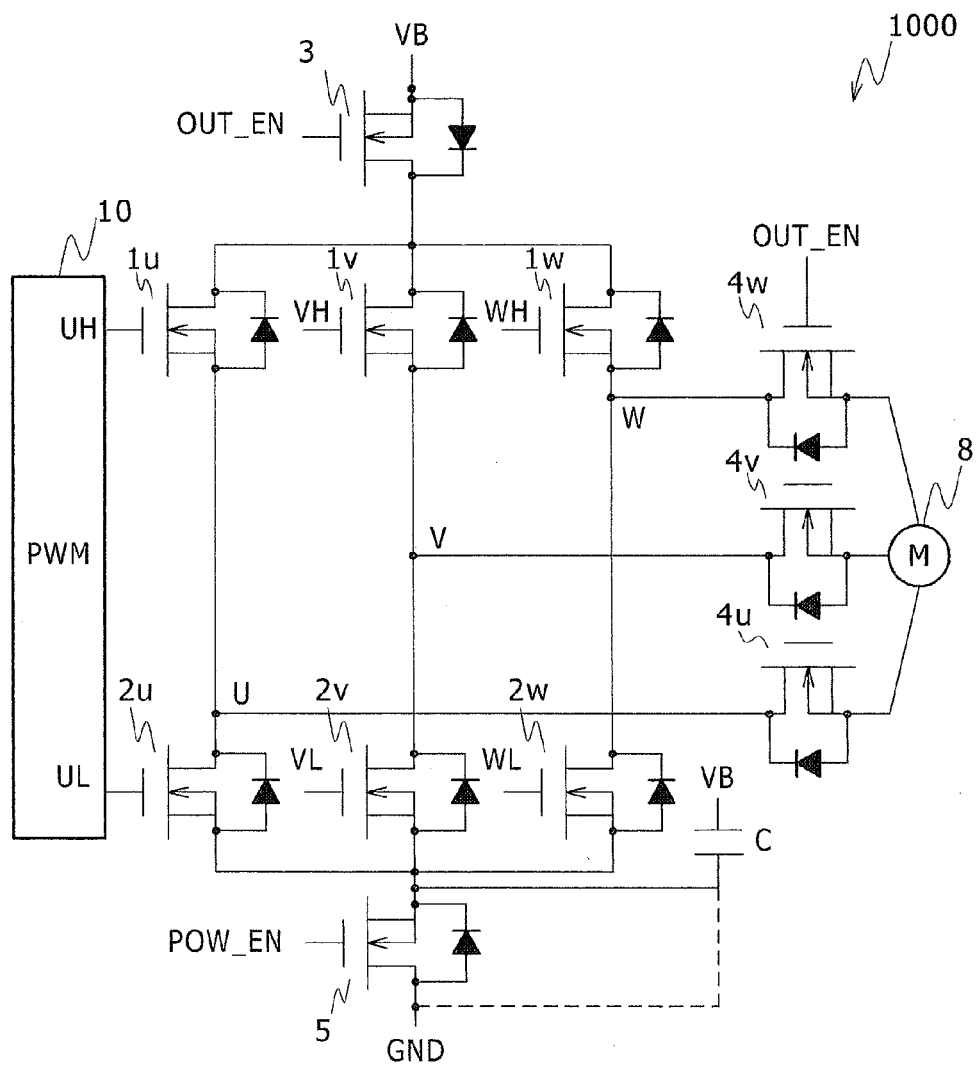
FIG. 12 is a diagram showing the structure of a circuit including an additional fifth-group MOSFET 5 for cutting off all currents in addition to the circuit structure shown in FIG. 4.

FIG. 12 is a diagram showing the structure of a circuit including an additional fifth-group MOSFET 5 for cutting off all currents in addition to the circuit structure shown in FIG. 4. The circuit structure shown in FIG. 12 is capable of exhibiting the same advantages as the structure shown in FIG. 10.

The case of the power conversion apparatus 1000 or a control apparatus is often connected to the ground. In the event of a failure, it is quite within the bounds of possibility that the circuit is short-circuited to GND rather than being short-circuited to VB. Accordingly, if the structures shown in FIGS. 10 and 12 are compared with each other, it is obvious that the structure shown in FIG. 10 assures higher safety. This is because the structure shown in FIG. 10 is capable of cutting off the current with the use of the fifth-group MOSFET 5 at a location closest to the VB. If the case of the power conversion apparatus 1000 or the control apparatus is connected to the VB, on the other hand, the structure shown in FIG. 12 assumes higher safety.

Figure 13:
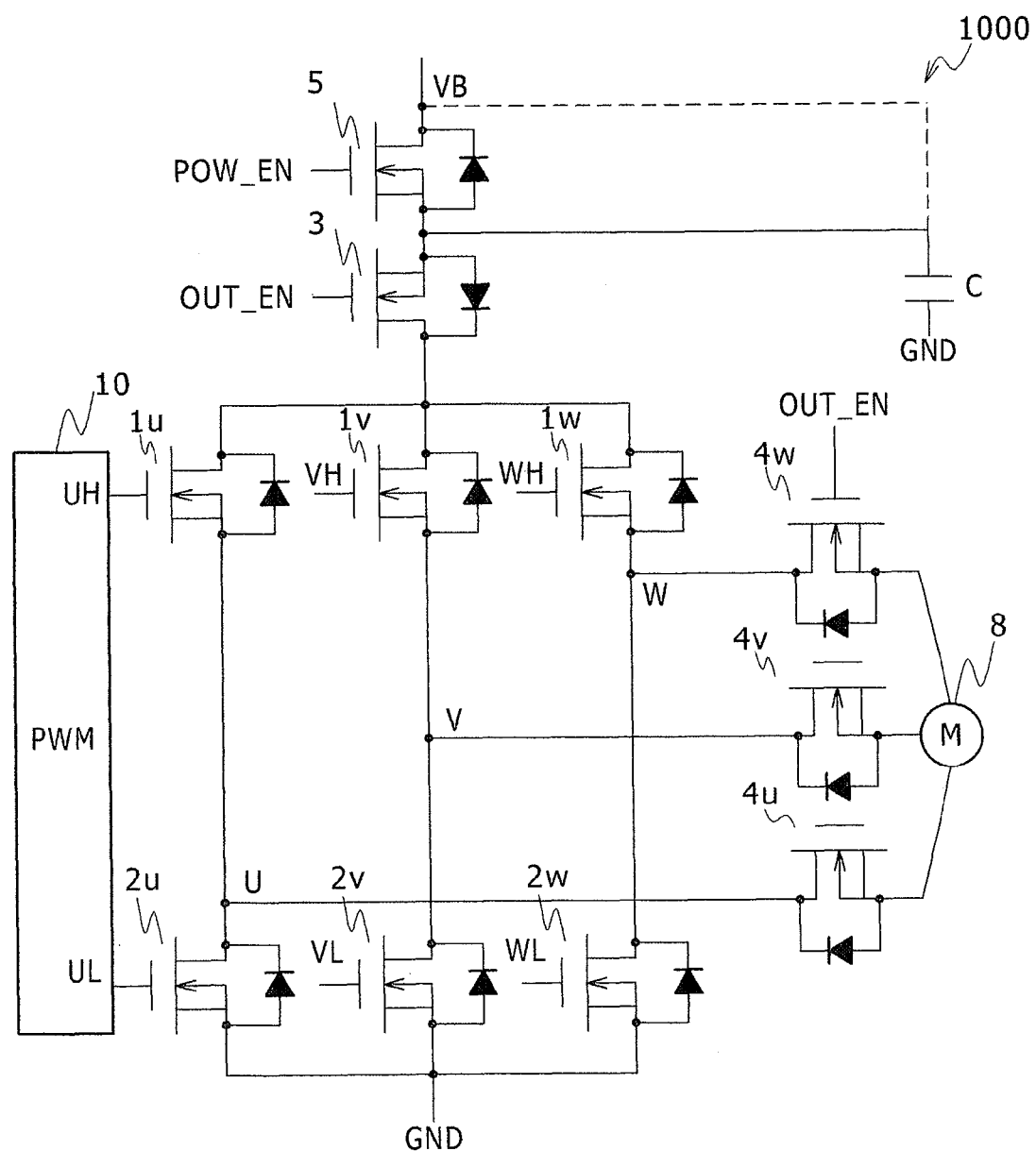
FIG. 13 is a diagram showing a modified version of the circuit structure shown in FIG. 12.
Figure 14:
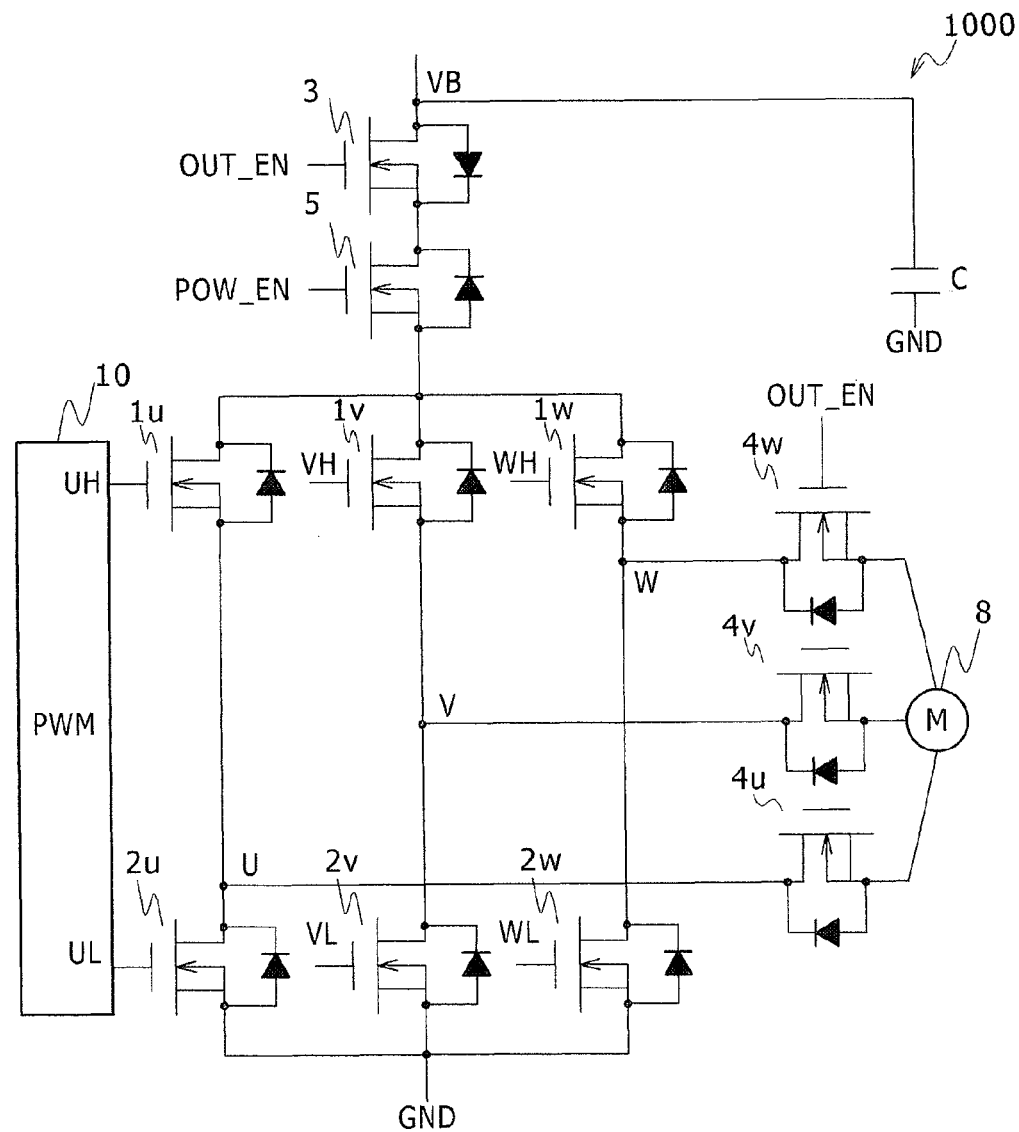
FIG. 14 is a diagram showing a modified version of the circuit structure shown in FIG. 12.

FIGS. 13 and 14 are each a diagram showing a modified version of the circuit structure shown in FIG. 12. If the case of the power conversion apparatus 1000 or a control apparatus is connected to the ground, it is desirable to connect the fifth-group MOSFET 5 to the side of the power supply VB in place of the structure shown in FIG. 12. The fifth-group MOSFET 5 is thereby capable of cutting off the current at a location closest to the power supply VB, and safety can be enhanced.

A capacitor C is added for reducing the impedance of the power supply VB in the circuit structure shown in FIG. 10. In this case, it is desirable to insert the capacitor C into a location between a terminal on the three-phase-inverter side of the third-group MOSFET 3 and the GND as shown in FIG. 10. It is also possible to insert the capacitor C into a location between a terminal on the power-supply-VB side of the third-group MOSFET 3 and the GND. However, the impedance will be increased by an amount corresponding to the on-resistance of the fifth-group MOSFET 5. For the same reason as the structure explained earlier with reference to FIG. 4, it is not desirable to insert the capacitor C into a location between the terminal of the fourth-group MOSFET 4 on the three-phase-inverter side and the terminal of the fifth-group MOSFET 5 on the three-phase-inverter side or into a location between the terminal of the fourth-group MOSFET 4 on the three-phase-inverter side and the power supply VB.

In the circuit structure shown in FIG. 12, it is desirable to insert the capacitor C into a location between the terminal of the fifth-group MOSFET 5 on the three-phase-inverter side and the power supply VB as shown in FIG. 12. It is also possible to insert the capacitor C into a location between the GND-side terminal of the fifth-group MOSFET 5 and the power supply VB. However, the impedance will be increased by an amount corresponding to the on-resistance of the fifth-group MOSFET 5. For the same reason as the structure explained earlier with reference to FIG. 4, it is not desirable to insert the capacitor C into a location between the terminal of the third-group MOSFET 3 on the three-phase-inverter side and the terminal of the fifth-group MOSFET 5 on the three-phase-inverter side or into a location between the terminal of the third-group MOSFET 3 on the three-phase-inverter side and the GND.

In the circuit structure shown in FIG. 13, it is desirable to insert the capacitor C into a location between the terminal of the fifth-group MOSFET 5 on the three-phase-inverter side and the GND. It is also possible to insert the capacitor C into a location between the ground-side terminal of the fifth-group MOSFET 5 and the GND. However, the impedance will be increased by an amount corresponding to the on-resistance of the fifth-group MOSFET 5.

In the circuit structure shown in FIG. 14, it is desirable to insert the capacitor C into a location between the power supply VB and the ground. In the case of both the structures shown in FIGS. 13 and 14, it is not desirable to insert the capacitor C into a location between the terminal of the third-group MOSFET 3 on the three-phase-inverter side and the GND for the same reason as the structure explained earlier with reference to FIG. 4.

Figure 15:
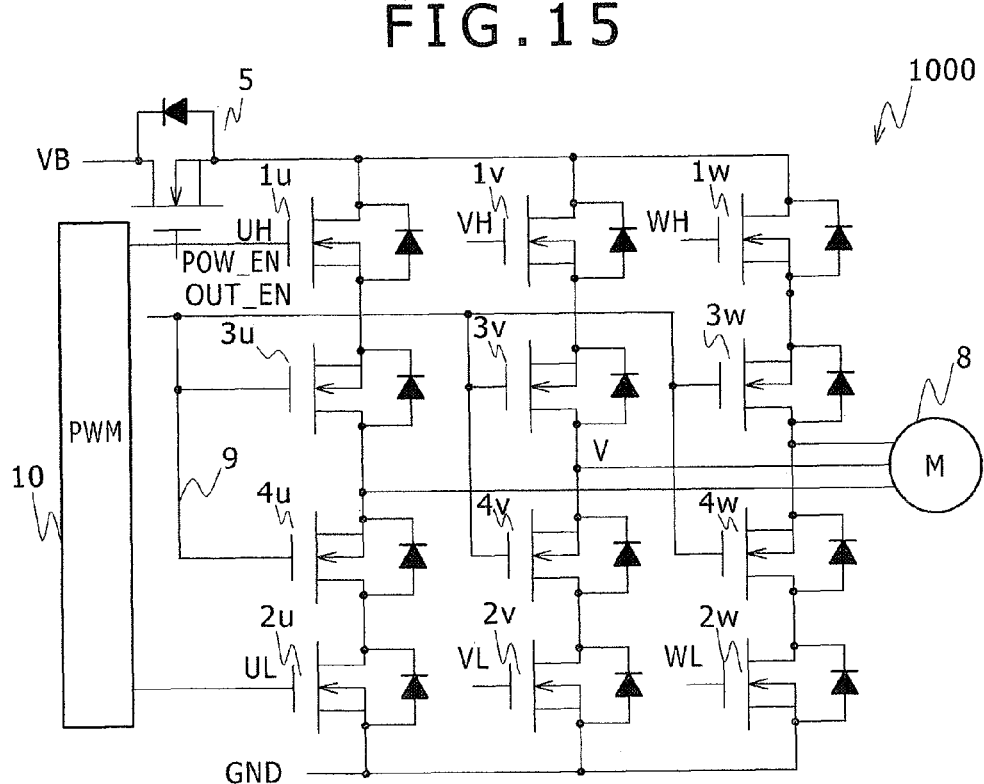
FIG. 15 is a diagram showing the structure of a circuit including an additional fifth-group MOSFET 5 for cutting off all currents in addition to the circuit structure shown in FIG. 8.

FIG. 15 is a diagram showing the structure of a circuit including an additional fifth-group MOSFET 5 for cutting off all currents in addition to the circuit structure shown in FIG. 8. In the structure shown in FIG. 15, the orientation of the parasitic capacitor of the fifth-group MOSFET 5 is opposite to that of the parasitic capacitors of the third-group MOSFETs 3u to 3w and the orientation of the parasitic capacitors of the fourth-group MOSFETs 4u to 4w.

In the structure shown in FIG. 15, the third-group MOSFETs 3u to 3w and the fourth-group MOSFETs 4u to 4w are powered off in order to cut off currents in all directions independently of the orientations of the parasitic diodes. That is to say, by merely increasing the on-resistance of one semiconductor device, the power supply (all currents) can be cut off in the event of an abnormality.

Figures 16, 17:
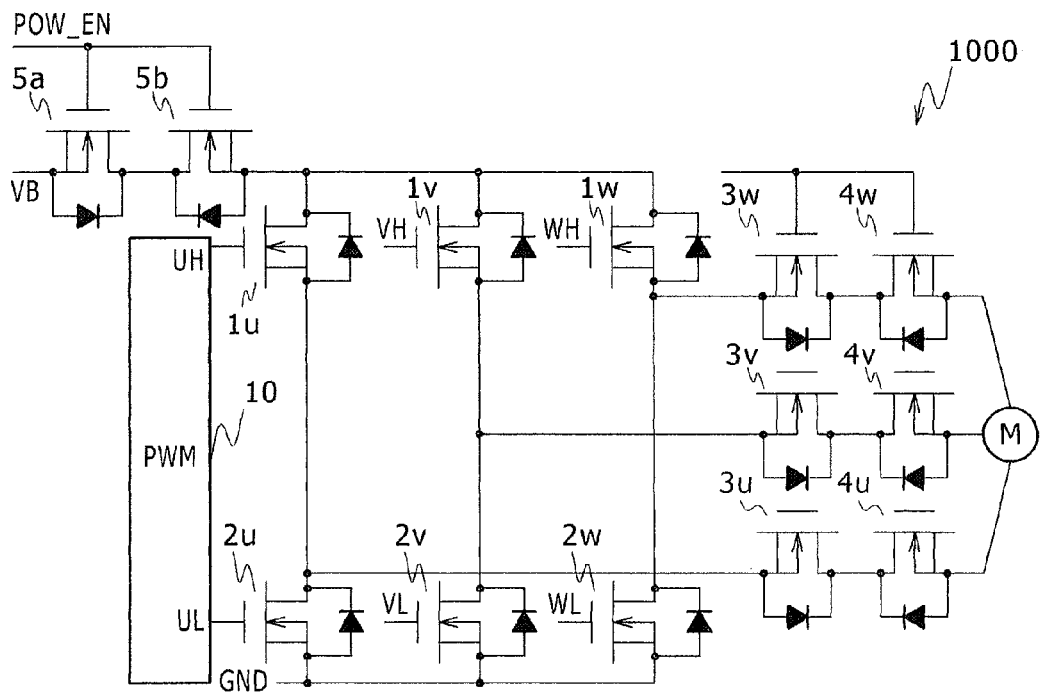
FIG. 16 is a diagram showing the structure of a circuit including additional fifth-group MOSFETs 5a and 5b for cutting off all currents in addition to the circuit structure shown in FIG. 9.
FIG. 17 is a diagram showing a table comparing The number of MOSFET required for cutting off all currents in the fourth embodiment explained earlier with The number of MOSFET required for cutting off all currents in the first to third embodiments explained earlier.

FIG. 16 is a diagram showing the structure of a circuit including additional fifth-group MOSFETs 5a and 5b for cutting off all currents in addition to the circuit structure shown in FIG. 9. The fifth-group MOSFETs 5a and 5b are connected in such a way that their parasitic diodes are oriented in directions opposite to each other.

In the circuit structure shown in FIG. 16, at a normal time, the third-group MOSFET 3 or the fourth-group MOSFET 4 and the fifth-group MOSFETs 5a and 5b are powered on. Thus, the first-group MOSFETs 1u to 1w and the second-group MOSFETs 2u to 2w can be used to implement a normal motor driving operation. In the event of an abnormality, on the other hand, the third-group MOSFET 3 or the fourth-group MOSFET 4 and the fifth-group MOSFETs 5a and 5b are powered off, so that all currents can be cut off without the parasitic diodes forming the short-circuit closed circuit explained earlier in the description of the first embodiment.

In the same way as the structure shown in FIG. 9, other series circuits can be connected instead of the fifth-group MOSFETs 5a and 5b, the circuits being coupled to devices such as a thyristor, an IGBT, and a bipolar transistor in parallel to each other in opposite directions, the devices not having a parasitic diode.

FIG. 17 is a diagram showing a table comparing the number of MOSFET required for cutting off all currents in this embodiment with the number of MOSFET explained in the first to third embodiments. The number of MOSFET required is compared with the number of MOSFET serially connected where currents pass on current paths as on-resistance indexes in FIG. 17 as well.

The number of MOSFLETs required is expressed as the sum of "[the number of MOSFETs required for building a three-phase inverter] and [the number of additional MOSFETs required for implementing circuit structures]". The number of MOSFETs required for building a three-phase inverter is 6. The number of MOSFLETs serially connected is the number of MOSFETs through which a current flows on a current path of the power supply→the motor→the ground at driving, and on a current path of the ground→the motor→the power supply at back flow.

The number of MOSFLETs required is at a minimum in FIG. 2. However, the number of MOSFLETs serially connected on a current path at driving is at a minimum in FIG. 8. The number of MOSFLETs serially connected at back flow is at a minimum in both FIGS. 2 and 8. Accordingly, the structure shown in FIG. 2 is found to be desirable in order to minimize the cost; the structure shown in FIG. 8 is found to be desirable in order to minimize the loss and maximize the efficiency. Moreover, currents are concentrated on the fourth-group MOSFET 4 and the fifth-group MOSFET 5 or the duty in current application becomes higher also in the structure shown in FIG. 2. Thus, in some cases, it is necessary to use a MOSFET having a largish specification value or to enhance heat dissipation. The cost in FIG. 2 is therefore not always lower than that of the structures shown in FIGS. 8 and 9.

The above descriptions are summarized to provide an object of the present invention as follows. A mandatory condition for preventing a regeneration braking operation due to a short circuit to VB or GND of a winding (particularly, the phase output side and a neutral point side at the Y wire connection) of the motor 8 is prevention of a current path from being caused by parasitic diodes coupled in parallel to MOSFETs provided at locations between the motor 8 of winding and the power supply, as well as between the motor 8 of winding and the ground. Thus, at least one MOSFET needs to be inserted into a location between the motor 8 of winding and the power supply as well as a location between the motor 8 of winding and the ground. This MOSFET should have a parasitic diode coupled in parallel thereto in an orientation opposite to that of other parasitic diodes.

Examples of methods for inserting the MOSFET having a parasitic diode coupled in parallel thereto in an orientation opposite to that of other parasitic diodes can be conceivably the following two: a method for inserting the MOSFET in series into a location between the respective phase outputs of the three-phase inverter and the motor 8 of winding; and a method for inserting the MOSFET in series with a MOSFET included in the original three-phase inverter. If the MOSFET is inserted in series into a location between the respective phase outputs of the three-phase inverter and the motor 8 of winding, the MOSFET is inserted into a back-and-forth current path between the respective phase outputs of the three-phase inverter and the motor 8 of winding. In addition, one MOSFET is always oriented in the forward direction, having no contribution to the prevention of the formation of the current path. Thus, the number of MOSFETs inserted in series with the current path wastefully increases. Therefore, it is desirable to insert the MOSFET in series with respect to a MOSFET included in the original three-phase inverter in order to reduce the on-resistance and increase the efficiency, the inserted MOSFET having a parasitic diode coupled in parallel thereto as much as possible in an orientation opposite to that of other parasitic diodes. At the same time, following can be said from a different viewpoint. The MOSFET having a parasitic diode coupled in parallel thereto in an orientation opposite to that of other parasitic diodes is inserted in series with other MOSFETs.

In the regards above, the embodiment shown in FIG. 8 is the most desirable. In this embodiment, both the two MOSFETs each having a parasitic diode coupled in parallel thereto in an orientation opposite to that of other parasitic diodes are inserted in series with a MOSFET included in the original three-phase inverter. The second most desirable embodiment is shown in FIG. 2 or 4. In this embodiment one MOSFET is inserted in series. In the embodiment shown in FIG. 9, MOSFETs each having a parasitic diode coupled in parallel thereto in an orientation opposite to that of other parasitic diodes are not inserted at all in series with a MOSFET included in the original three-phase inverter. This embodiment is not desirable since all the MOSFETs are inserted into locations between the respective phase outputs of the three-phase inverter and the motor 8 of winding.

When the MOSFETs each having a parasitic diode coupled in parallel thereto in an orientation opposite to that of other parasitic diodes are inserted in series with a MOSFET included in the original three-phase inverter, rather than insertion in series for each phase, insertion of a terminal of a MOSFET included in each phase into a point connected to one point is better in that the number of MOSFETs required in the structure can be reduced. From this viewpoint, it is obvious that the embodiments shown in FIGS. 3 and 4 are the most desirable, being followed by the embodiment shown in FIG. 1. Moreover, the embodiments shown in FIGS. 8 and 9 are found to be not desirable.

Fifth Embodiment

Figure 18:
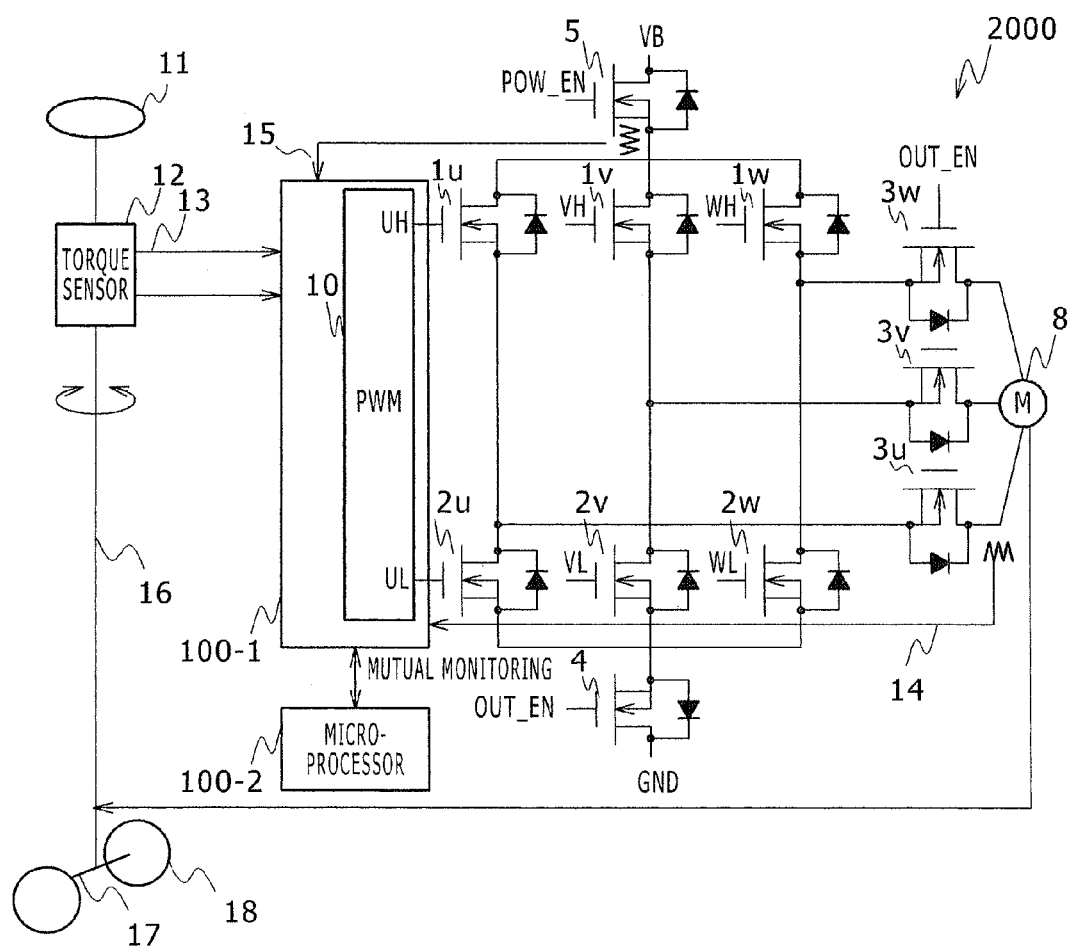
FIG. 18 is a diagram showing the structure of an electronic steering system 2000 according to a fifth embodiment.

FIG. 18 is a diagram showing the structure of an electronic steering system 2000 according to a fifth embodiment of the present invention. The electronic steering system 2000 has a structure identical with that of the power conversion apparatus 1000 according to any of the first to fourth embodiments explained so far. The electronic steering system 2000 further includes a steering wheel 11, a rotation shaft 16 attached to the steering wheel 11, a torque sensor 12 attached to the rotation shaft 16, a steering mechanism 17, microprocessors 100-1 and 100-2, and a motor 8. A phase-current detection signal 14 and an all-current detection signal 15 are input to the microprocessor 100-1.

The steering mechanism 17 is subjected to a steering operation carried out by the rotation shaft 16 and is used for controlling the direction of vehicle wheels 18. The steering mechanism 17 or the rotation shaft 16 receives a supplementary steering force generated by the motor 8. On the basis of the output 13 of the torque sensor 12, the microprocessor 100-1 outputs control signals to the first-group MOSFETs 1u to 1w, the second-group MOSFETs 2u to 2w, the third-group MOSFETs 3u to 3w, the fourth-group MOSFET 4 and the fifth-group MOSFET 5 through a PWM timer 10 so that the phase-current detection signal 14 attains a target value. The motor 8 is driven by a three-phase inverter including these switching devices.

An abnormality is detected from typically the phase-current detection signal 14 when there is any. At this time, the third-group MOSFETs 3u to 3w and the fourth-group MOSFET 4 reliably detach the motor 8 from the power conversion apparatus (the three-phase inverter). It is thus possible to ensure safety without disturbing an operation carried out on the motor 8 in accordance with an input added to the steering wheel 11, that is, an operation carried out on the rotation shaft 16 and the steering mechanism 17. Also in the event of overcurrent, the abnormality is detected from the all-current detection signal 15 so that it is possible to reliably power off the power supply with the use of the fifth-group MOSFET 5 and thereby ensure safety.

FIG. 18 shows an example having a circuit structure identical with that of the power conversion apparatus 1000 shown in FIG. 10. However, the structure of any other embodiment can also be adopted. If the circuit structure does not include the fifth-group MOSFET 5 for cutting off all the currents, a relay or the like is used for interrupting all the currents, so that an electronic steering system 2000 can be structured in the same way. This statement holds true for embodiments described below.

Sixth Embodiment

Figure 19:
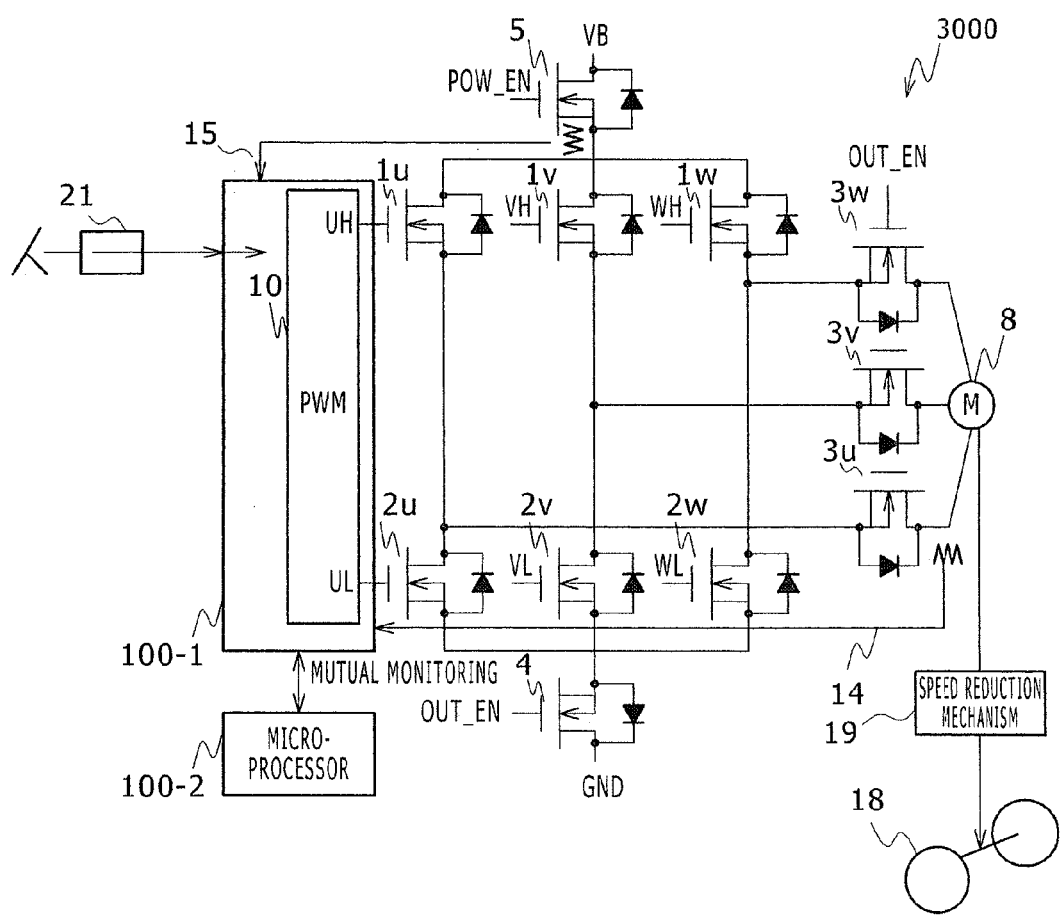
FIG. 19 is a diagram showing the structure of an electric vehicle 3000 according to a sixth embodiment.

FIG. 19 is a diagram showing the structure of an electric vehicle 3000 according to a sixth embodiment of the present invention. The electric vehicle 3000 has a structure identical with that of the power conversion apparatus 1000 according to any of the first to fourth embodiments explained so far. The electric vehicle 3000 further includes an MOSFET 21 for detecting an acceleration amount of an acceleration pedal being pressed, microprocessors 100-1 and 100-2, a motor 8, vehicle wheels 18 driven by the motor 8, and, if necessary, a speed reduction mechanism 19.

A phase-current detection signal 14 and an all-current detection signal 15 are supplied to the microprocessor 100-1. On the basis of the output of the MOSFET 21, the microprocessor 100-1 outputs control signals to the first-group MOSFETs 1u to 1w, the second-group MOSFETs 2u to 2w, the third-group MOSFETs 3u to 3w, the fourth-group MOSFET 4, and the fifth-group MOSFET 5 through a PWM timer 10. The motor 8 is driven by a three-phase inverter composed of these switching devices.

An abnormality is detected from typically the phase-current detection signal 14 when there is any. At this time, the third-group MOSFETs 3u to 3w and the fourth-group MOSFET 4 reliably detach the motor 8 from the power conversion apparatus (the three-phase inverter). It is thus possible to avoid a regeneration braking operation of the motor 8, that is, to prevent a sudden braking operation on the vehicle body driven by the vehicle wheels 18, the vehicle body being not shown in the figure.

Seventh Embodiment

Figure 20:
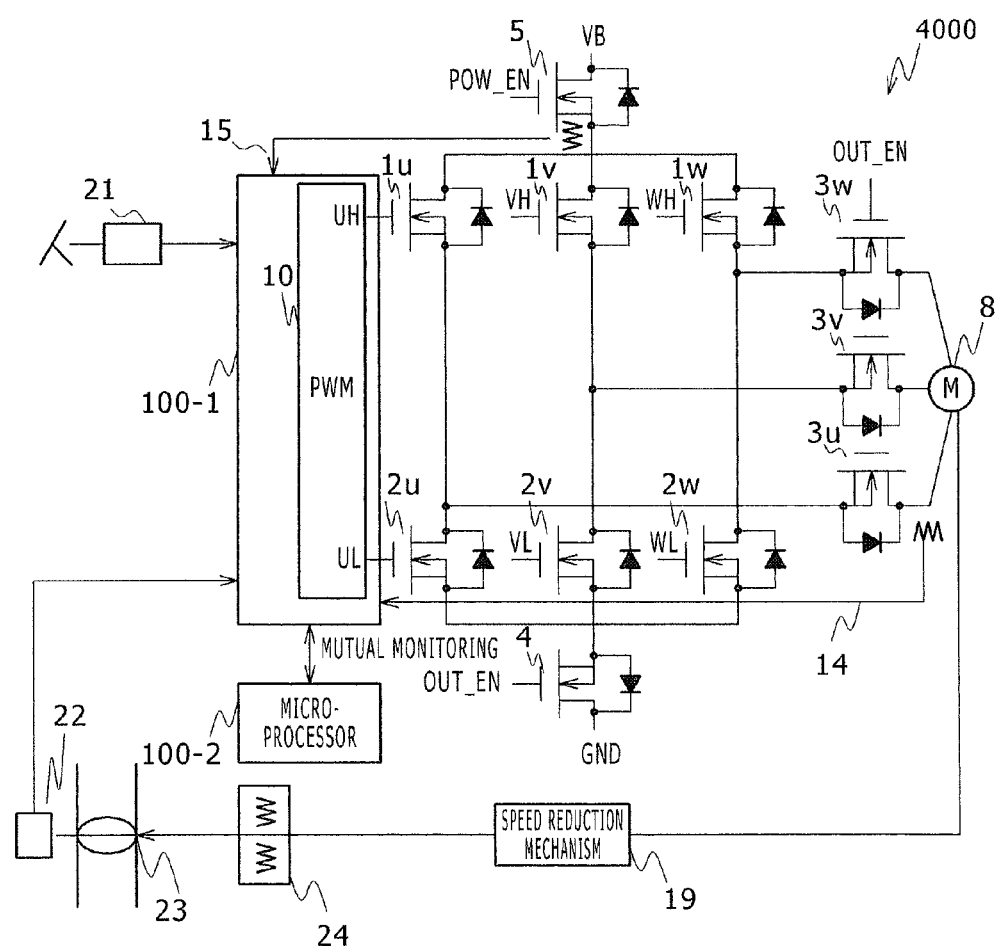
FIG. 20 is a diagram showing the structure of an electronic control throttle 4000 according to a seventh embodiment.

FIG. 20 is a diagram showing the structure of an electronic control throttle 4000 according to a seventh embodiment of the present invention. The electronic control throttle 4000 has a structure identical with that of the power conversion apparatus 1000 according to any of the first to fourth embodiments explained so far. The electronic control throttle 4000 further includes a MOSFET 21 for detecting an acceleration amount of an acceleration pedal being pressed, microprocessors 100-1 and 100-2, a motor 8, a throttle valve 23 driven by the motor 8, throttle-position sensor 22 for measuring the opening of the throttle valve 23, a throttle position mechanism 24, and, if necessary, a speed reduction mechanism 19. The throttle position mechanism 24 is a mechanism which is used for setting the throttle valve 23 at a predetermined opening that allows speed control by means of a brake when the motor 8 is out of driving force.

A phase-current detection signal 14 and an all-current detection signal 15 are input to the microprocessor 100-1. On the basis of the output of the MOSFET 21, the microprocessor 100-1 outputs control signals to the first-group MOSFETs 1u to 1w, the second-group MOSFETs 2u to 2w, the third-group MOSFETs 3u to 3w, the fourth-group MOSFET 4, and the fifth-group MOSFET 5 through a PWM timer 10 so that an opening measured by the throttle-position sensor 22 as the opening of the throttle valve 23 is set at a value determined in advance. The motor 8 is driven by a three-phase inverter including these switching devices.

In the event of a typically abnormality generated in the power conversion apparatus (the three-phase inverter), the abnormality is detected from the phase-current detection signal 14 or the like. At this time, the third-group MOSFETs 3u to 3w and the fourth-group MOSFET 4 reliably detach the motor 8 from the power conversion apparatus (the three-phase inverter) whereas the throttle position mechanism 24 maintains the throttle valve 23 at an opening determined in advance. It is thereby possible to carry out speed control by means of the brake and to continue the driving.

Eighth Embodiment

Figure 21:
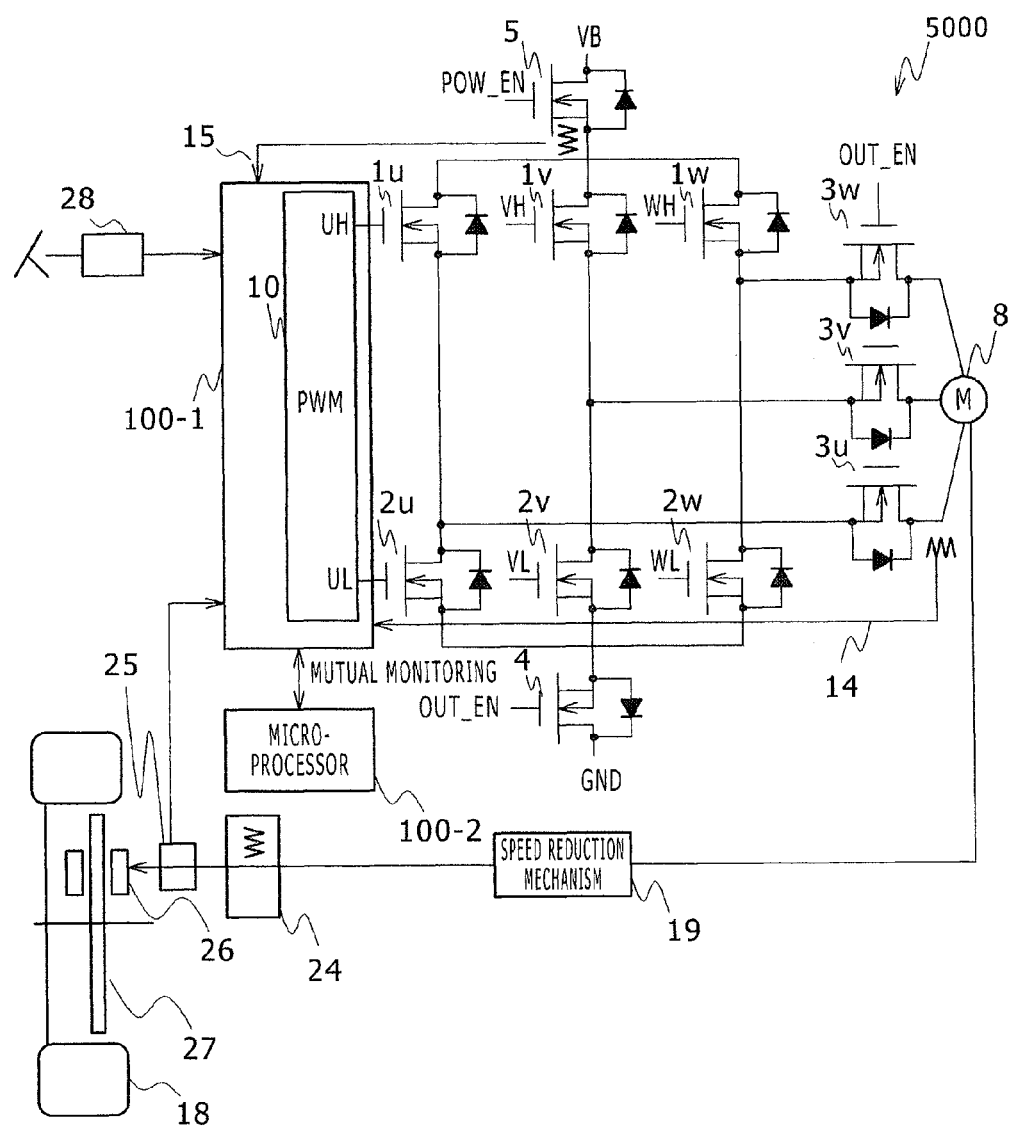
FIG. 21 is a diagram showing the structure of a power brake 5000 according to an eighth embodiment.

FIG. 21 is a diagram showing the structure of a power brake 5000 according to an eighth embodiment of the present invention. The power brake 5000 has a structure identical with that of the power conversion apparatus 1000 according to any of the first to fourth embodiments explained so far. The power brake 5000 further includes a brake-pedal position sensor 28, microprocessors 100-1 and 100-2, a motor 8, a brake pad 26, a thrust sensor 25, a throttle position mechanism 24, and, if necessary, a speed reduction mechanism 19. The brake-pedal position sensor 28 is a sensor for detecting a braking amount of a brake pedal being pressed. The brake pad 26 is a pad driven by the motor 8. The thrust sensor 25 is a sensor for measuring a pushing amount of the brake pad 26 being pushed to a rotor 27. The throttle position mechanism 24 is a mechanism for holding the brake pad 26 at a position at which the brake pad 26 is not being pushed to the rotor 27 when the motor 8 is out of driving force.

A phase-current detection signal 14 and an all-current detection signal 15 are input to the microprocessor 100-1. On the basis of the output of the brake-pedal position sensor 28, the microprocessor 100-1 outputs control signals to the first-group MOSFETs 1u to 1w, the second-group MOSFETs 2u to 2w, the third-group MOSFETs 3u to 3w, the fourth-group MOSFET 4, and the fifth-group MOSFET 5 through a PWM timer 10 so that the amount measured by the thrust sensor 25 as the pushing amount of the brake pad 26 being pushed to the rotor 27 attains a value determined in advance. The motor 8 is driven by a three-phase inverter including these switching devices.

In the event of a typically abnormality generated in the power conversion apparatus (the three-phase inverter), the abnormality is detected from the phase-current detection signal 14 or the like. At this time, the third-group MOSFETs 3u to 3w and the fourth-group MOSFET 4 reliably detach the motor 8 from the power conversion apparatus (the three-phase inverter) whereas the throttle position mechanism 24 maintains the brake pad 26 at a position at which the brake pad 26 is not being pushed to the rotor 27. It is thereby possible to prevent a sudden braking operation on the vehicle body driven by the vehicle wheels 18, the vehicle body being not shown in the figure.

Ninth Embodiment

Figure 22:
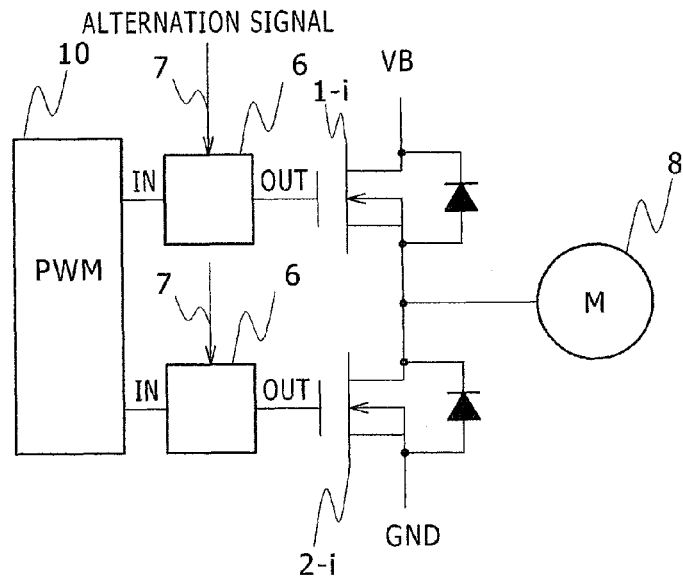
FIG. 22 is a diagram showing the structure of circuits surrounding a PWM timer 10 in the power conversion apparatus 1000 according to a ninth embodiment.

FIG. 22 is a diagram showing the structure of circuits surrounding a PWM timer 10 in the power conversion apparatus 1000 according to a ninth embodiment of the present invention. A charge-pump pre-driver 6 includes a charge pump 61 operating in accordance with an alternation signal 7 supplied thereto and a pre-driver 62 operating in accordance with a power-supply voltage boosted by the charge pump 61. The charge-pump pre-driver 6 controls the gate terminals of the first-group MOSFETs 1u to 1w and the gate terminals of the second-group MOSFETs 2u to 2w. It is to be noted that, the figure shows only the first-group MOSFET 1i and the second-group MOSFET 2i for a phase where suffix i is either u, v, or w in FIG. 22 for the sake of simplicity.

In many cases, the failure of the output of a semiconductor device is attributed to a stuck-at fault causing the output to be stuck to the H or L level. With the use of the alternation signal 7 as a signal for permitting the output at a normal time, it is possible not only to prevent the output from being fixed in a state of allowing the output due to the stuck-at fault, but also verify that an operation can be carried out to alternately change the level from H to L or vice versa in a periodical manner.

Figure 23:
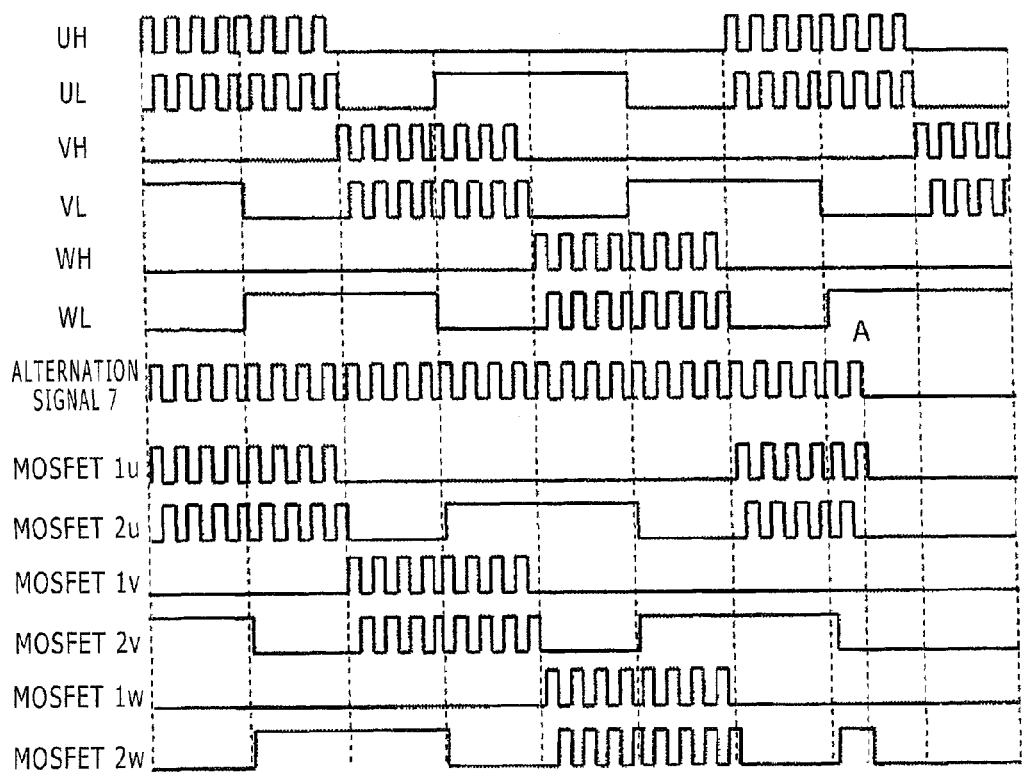
FIG. 23 is time charts of operations carried out in the circuit structure shown in FIG. 22.

FIG. 23 is time charts of operations carried out in the circuit structure shown in FIG. 22. Notations UH, UL, VH, VL, WH, and WL denote upper-arm and lower-arm driving signals for the U, V, and W phases, the signals being output from the PWM timer 10. The first-group MOSFETs $1u$ to $1w$ and the second-group MOSFETs $2u$ to $2w$ are driven before a time A when the alternation signal 7 is being output. After the time A at which the alternation signal 7 is stopped, however, the first-group MOSFETs $1u$ to $1w$ and the second-group MOSFETs $2u$ to $2w$ are no longer driven and put in power OFF.

By carrying out the operations shown in FIG. 23, it is possible to stop the alternation signal 7 and the operations of the three-phase inverter in the event of an abnormality, whereby safety can be ensured.

Figure 24:
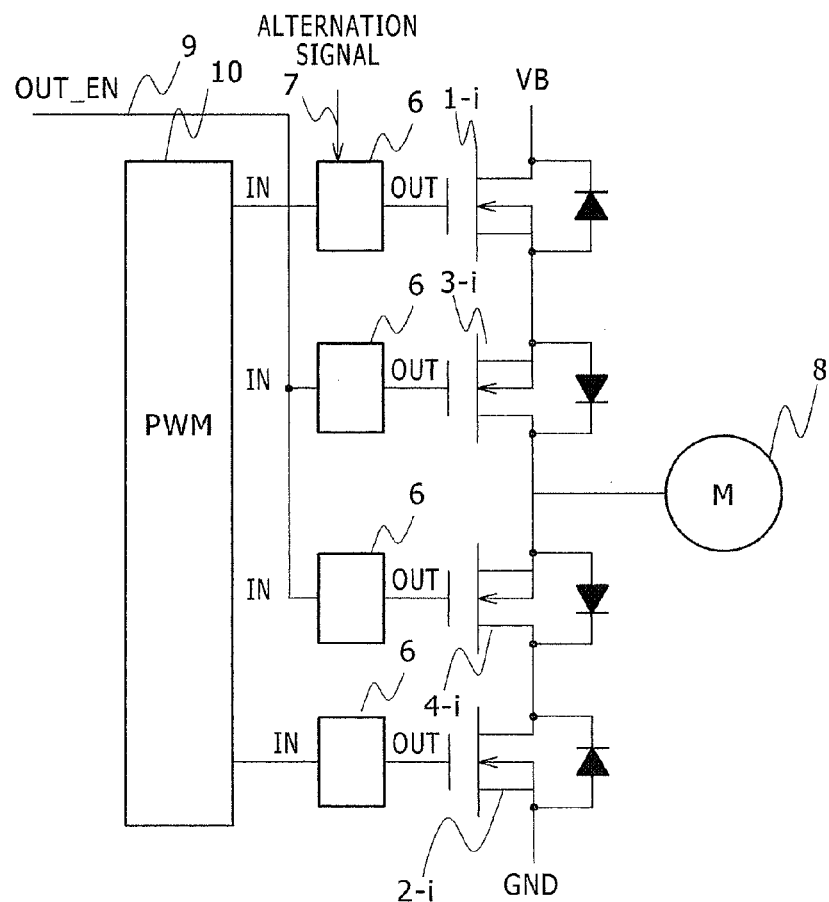
FIG. 24 is a diagram showing a modified version of the circuit structure shown in FIG. 22.

FIG. 24 is a diagram showing a modified version of the circuit structure shown in FIG. 22. In the structure shown in FIG. 24, the alternation signal 7 is used to drive not only the gate terminals of the first-group MOSFETs $1u$ to $1w$ and the gate terminals of the second-group MOSFETs $2u$ to $2w$, but also the gate terminals of the third-group MOSFETs $3u$ to $3w$ and the gate terminals of the fourth-group MOSFETs $4u$ to $4w$. In the same way, the fifth-group MOSFET 5 can also be controlled with the charge-pump pre-driver 6.

Figure 25:
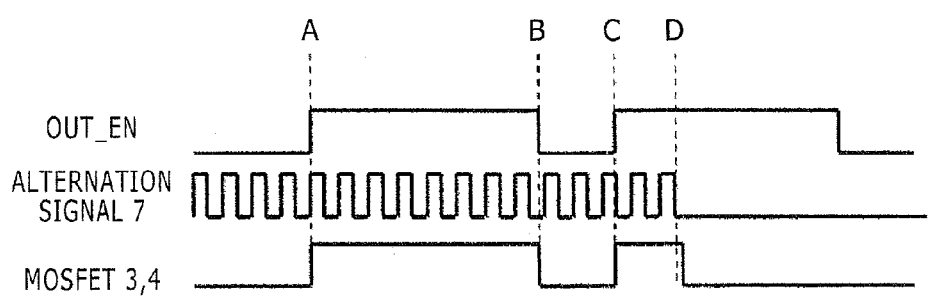
FIG. 25 is time charts of operations carried out in the circuit structure shown in FIG. 24.

FIG. 25 is time charts of operations carried out in the circuit structure shown in FIG. 24. When the alternation signal 7 is output prior to a time D, a signal OUT_EN can be used to control the third-group MOSFETs $3u$ to $3w$ and the fourth-group MOSFETs $4u$ to $4w$. During a period between times A and B when the signal OUT_EN is in ON, the third-group MOSFETs $3u$ to $3w$ and the fourth-group MOSFETs $4u$ to $4w$ are powered ON. During a period between the time B and a time C when the signal OUT_EN is in OFF, the third-group MOSFETs $3u$ to $3w$ and the fourth-group MOSFETs $4u$ to $4w$ are powered off. During a period between the times C and D when the signal OUT_EN is ON again and the alternation signal 4 is being output, the third-group MOSFETs $3u$ to $3w$ and the fourth-group MOSFETs $4u$ to $4w$ are powered on. After the time D at which the alternation signal 7 is stopped, the third-group MOSFETs $3u$ to $3w$ and the fourth-group MOSFETs $4u$ to $4w$ are powered off.

By carrying out the operations shown in FIG. 25, it is possible to stop the alternation signal 7 and the operations of the three-phase inverter in the event of an abnormality, whereby safety can be ensured.

The fifth-group MOSFET 5 can also be controlled with the charge-pump pre-driver 6 in the same way. Thus, it is possible to stop the alternation signal 7 and cut off all currents. As a result, safety can be ensured.

Figure 26:
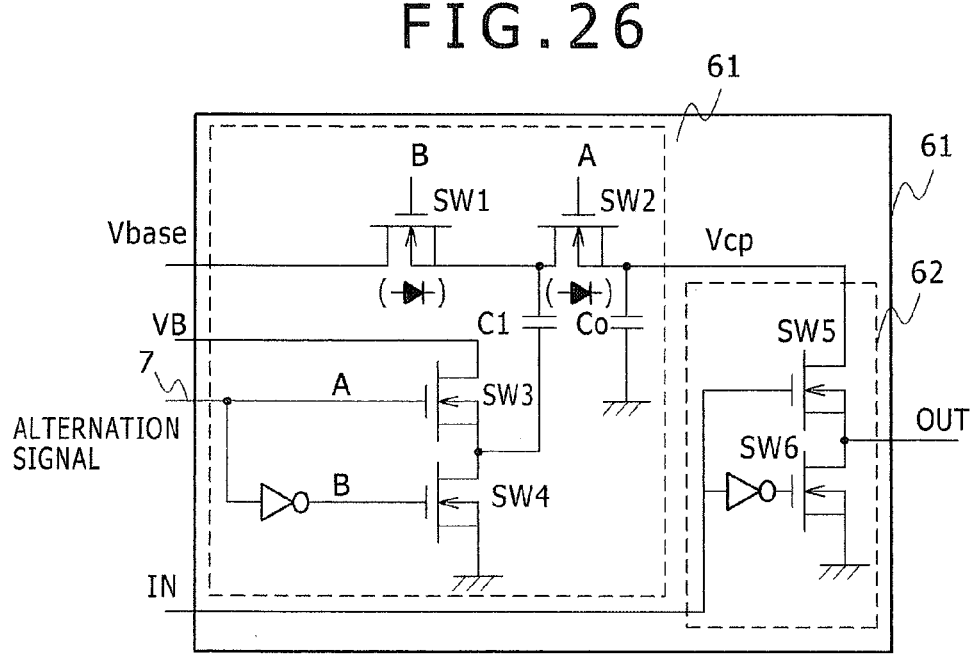
FIG. 26 is a diagram showing the circuit of a charge-pump pre-driver 6.

FIG. 26 is a diagram showing the circuit of the charge-pump pre-driver 6. The charge-pump pre-driver 6 includes a charge pump 61 operating in accordance with the alternation signal 7 supplied thereto and a pre-driver 62 operating in accordance with a power-supply voltage boosted by use of the charge pump 61.

The charge pump 61 has SW1, SW2, SW3, and SW4 including MOSFET, and capacitors C0 and C1. A voltage Vbase accumulated in the capacitor C1 when the SW1 and SW4 are powered on are added to the power supply VB and stored in the capacitor C0 when the MOSFETs SW2 and SW3 are powered on. This operation is carried out repeatedly to result in an electric potential of the capacitor C0 approaching the following level:

$$VCP = V\text{base} + VB$$

It is to be noted that the MOSFETs SW1 and SW2 can each be a diode.

On the basis of the voltage boosted as described above, the pre-driver 62 including SW5 and SW6 drives the respective gate terminals of MOSFETs of the power conversion apparatus 1000.

The charge-pump pre-driver 6 shown in FIG. 26 has a circuit structure including only one charge pump 61 and one pre-driver 62. However, the charge-pump pre-driver 6 may be provided with one charge pump 61 and a plurality of pre-drivers 62.

It is to be noted that, the connection of Vbase to a MOSFET source terminal of the driving object makes it possible for the pre-driver 62 to output a voltage higher than the electric potential of the source terminal by VB, so that a predetermined voltage can be applied between the source and the gate. In addition, when the equation Vbase=VB holds, the pre-driver 62 is capable of outputting the voltage where VCP=2VB.

Figure 27:
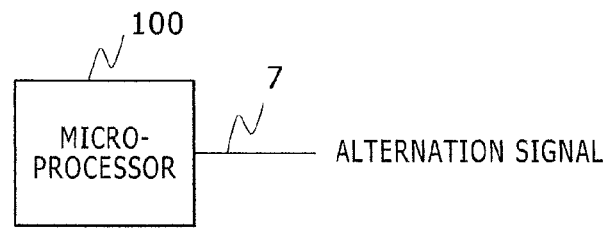
FIG. 27 is a diagram showing a typical structure in which a microprocessor 100 generates an alternation signal 7.

FIG. 27 is a diagram showing a typical structure in which a microprocessor 100 generates an alternation signal 7. The microprocessor 100 is capable of outputting the alternation signal 7 by periodically writing data for outputting signals of the H and L levels alternately into a register of an output port.

In accordance with the typical structure shown in FIG. 27, the microprocessor 100, when having an abnormality in it, is no longer capable of periodically writing data for outputting signals of the H and L levels alternately into the register of the output port. The microprocessor 100 is consequently no longer capable of outputting the alternation signal 7. Thus, the MOSFETs of the power conversion apparatus 1000 are powered off. Safety can be ensured accordingly.

Figure 28:
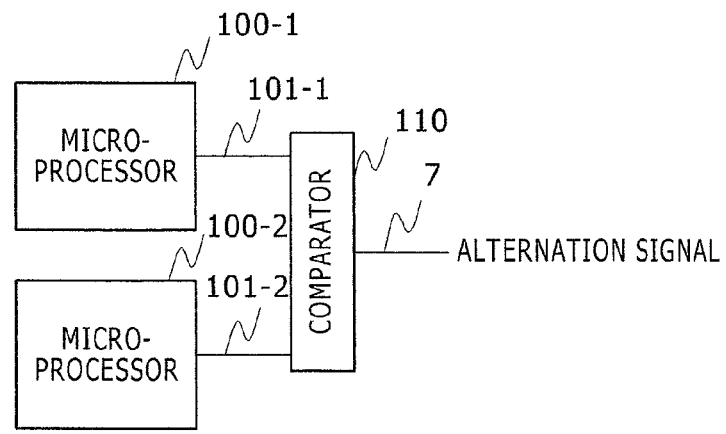
FIG. 28 is a diagram showing a typical structure in which a comparator 110 generates an alternation signal 7.

FIG. 28 is a diagram showing a typical structure in which a comparator 110 that compares a signal 101-1 output by a microprocessor 100-1 with a signal 101-2 output by a microprocessor 100-2 generates the alternation signal 7. When the comparator 110 is outputting the alternation signal 7, the comparator 110 periodically needs to inject errors as a test pattern into the signals 101-1 and 101-2 which are to be compared with each other. Alternatively, a comparator disclosed in JP-07-234801-A can be used as the comparator 110.

In accordance with the typical structure shown in FIG. 28, in the event of an abnormality generated in the microprocessor 100-1 or 100-2, the comparator 110 does not output the alternation signal 7 anymore. Thus, the MOSFETs of the power conversion apparatus 1000 are powered off, whereby safety can be ensured.

Figure 29:
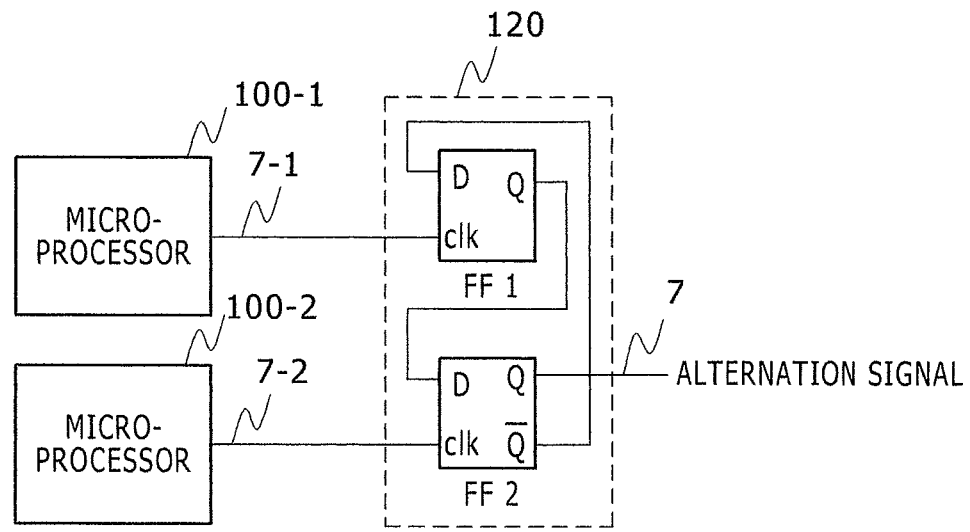
FIG. 29 is a diagram showing a typical structure in which an FS-AND 120 generates an alternation signal 7.

FIG. 29 is a diagram showing a typical structure in which the microprocessor 100-1 and the microprocessor 100-2 respectively generate alternation signals 7-1 and 7-2 supplied to a circuit FS-AND 120 including FF1 (Flip Flop) and FF2 for outputting an alternation signal 7. In accordance with the typical structure shown in FIG. 29, in the event of an abnormality generated in the microprocessor 100-1 or 100-2, the alternation signal 7-1 or 7-2 is no longer output. Thus, the MOSFETs of the power conversion apparatus 1000 are powered off so that safety can be ensured.

Figure 30:
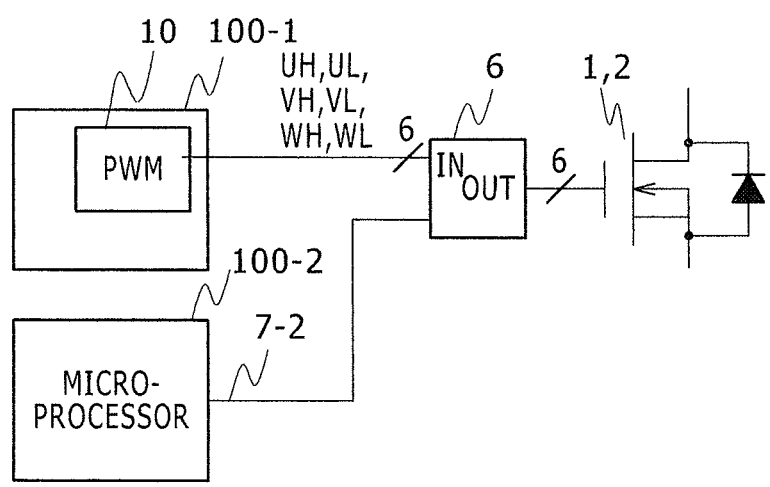
FIG. 30 is a diagram showing a typical structure in which a PWM timer 10 controls a charge-pump pre-driver 6.

FIG. 30 is a diagram showing a typical structure in which a charge-pump pre-driver 6 operated by an alternation signal 7 a microprocessor 100-2 generates is controlled by control signals UH, UL, VH, VL, WH and, WL output from a PWM timer 10 embedded in a microprocessor 100-1 to drive the first-group MOSFETs 1$u$ to 1$w$ and the second-group MOSFETs 2$u$ to 2$w$. In accordance with the typical structure shown in FIG. 30, even when an abnormality of the microprocessor 100-1 causes the PWM timer 10 to output incorrect control signals UH, UL, VH, VL, WH and WL, if the microprocessor 100-2 stops the alternation signal 7, the operation to drive the first-group MOSFETs 1$u$ to 1$w$ and the second-group MOSFETs 2$u$ to 2$w$ can be discontinued and powered off. It is thereby possible to ensure safety.

Figure 31:
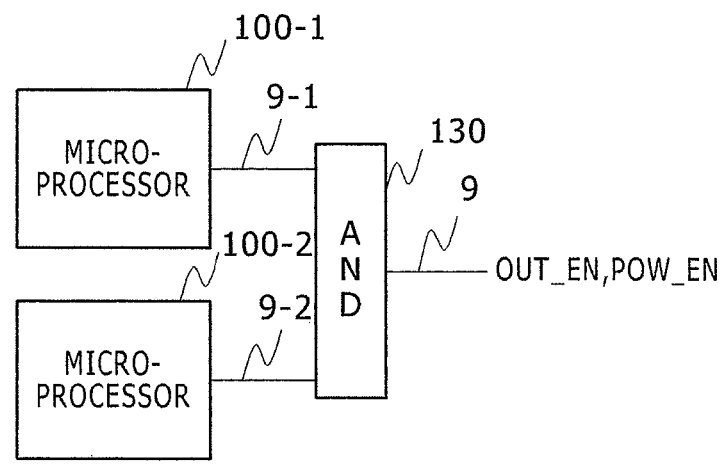
FIG. 31 is a diagram showing a typical structure in which the output of an AND 30 is used as OUT_END or POW_EN.

FIG. 31 is a diagram showing a typical structure in which microprocessors 100-1 and 100-2 respectively generate OUT_EN signals 9-1 and 9-2 while the output of an AND 130 serves as an OUT_EN or POW_EN signal. In accordance with the typical structure, shown in FIG. 31, when the microprocessor 100-1 or 100-2 determines that the phase output or all currents should be cut off, the phase output or all currents can be interrupted. It is thereby possible to ensure safety.

Figure 32:
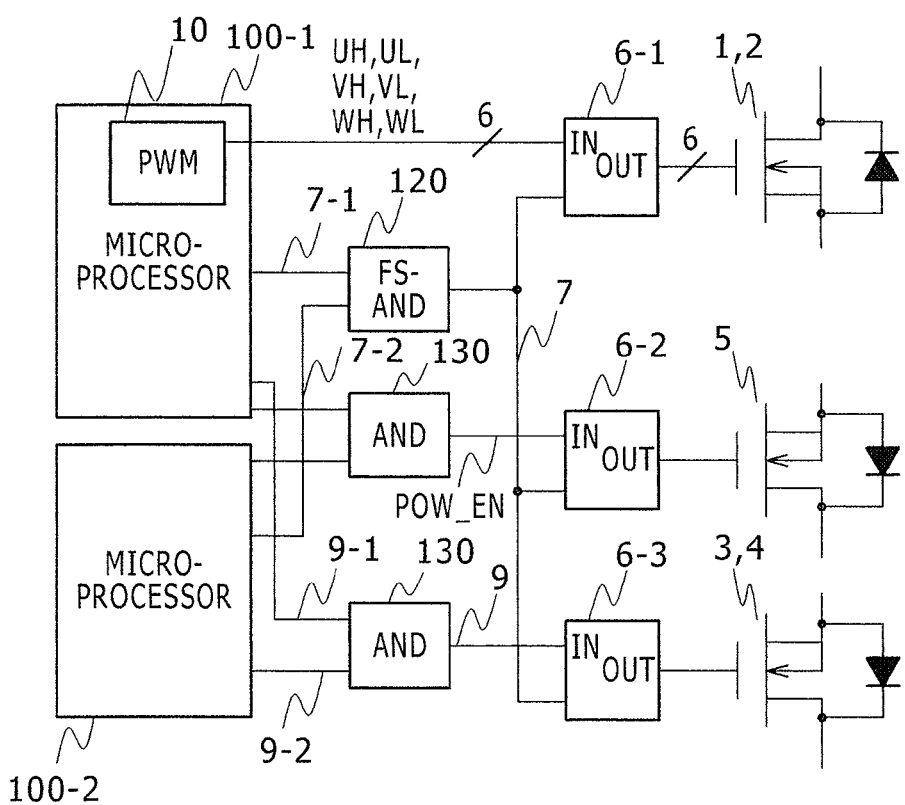
FIG. 32 is a diagram showing a typical structure combining an FS-AND of alternation signals, an AND of output control signals, and an AND of all-current control signals.

FIG. 32 is a diagram showing a typical structure combining an FS-AND of alternation signals, an AND of output control signals and an AND of all-current control signals.

The FS-AND 120 generates an alternation signal 7 from alternation signals 7-1 and 7-2 generated by the microprocessors 100-1 and 100-2, respectively. The alternation signal 7 drives charge-pump pre-drivers 6-1-6-3. The charge-pump pre-driver 6-1 is controlled by control signals UH, UL, VH, VL, WH, and WL output from a PWM timer 10 embedded in the microprocessor 100-1 to drive the first-group MOSFETs 1$u$ to 1$w$ and the second-group MOSFETs 2$u$ to 2$w$. The charge-pump pre-driver 6-2 uses a signal output by an AND 130-1 as a logical product of POWER_EN signals generated by the microprocessors 100-1 and 100-2 to drive the fifth-group MOSFET 5. The charge-pump pre-driver 6-3 uses a signal output by an AND 130-2 as a logical product of OUT_EN signals 9-1 and 9-2 generated by the microprocessors 100-1 and 100-2 to drive the third-group MOSFETs 3$u$ to 3$w$ and the fourth-group MOSFETs 4$u$ to 4$w$.

In accordance with the typical structure shown in FIG. 32, when the microprocessor 100-1 or 100-2 determines that the operation, the phase output, or all currents of the three-phase inverter should be cut off, these three elements can be cut off so that it is possible to ensure safety. In addition, even if a failure occurs in any of the charge-pump pre-drivers 6-1 to 6-3, resulting in a state of always driving the gate terminals of the MOSFETs, operations to drive the gate terminals of the other charge-pump pre-drivers can be stopped. It is thus possible to power off any of the first-group MOSFETs 1$u$ to 1$w$, the second-group MOSFETs 2$u$ to 2$w$, the third-group MOSFETs 3$u$ to 3$w$, the fourth-group MOSFETs 4$u$ to 4$w$ and the fifth-group MOSFET 5 and to ensure safety.

Tenth Embodiment

Figure 33:
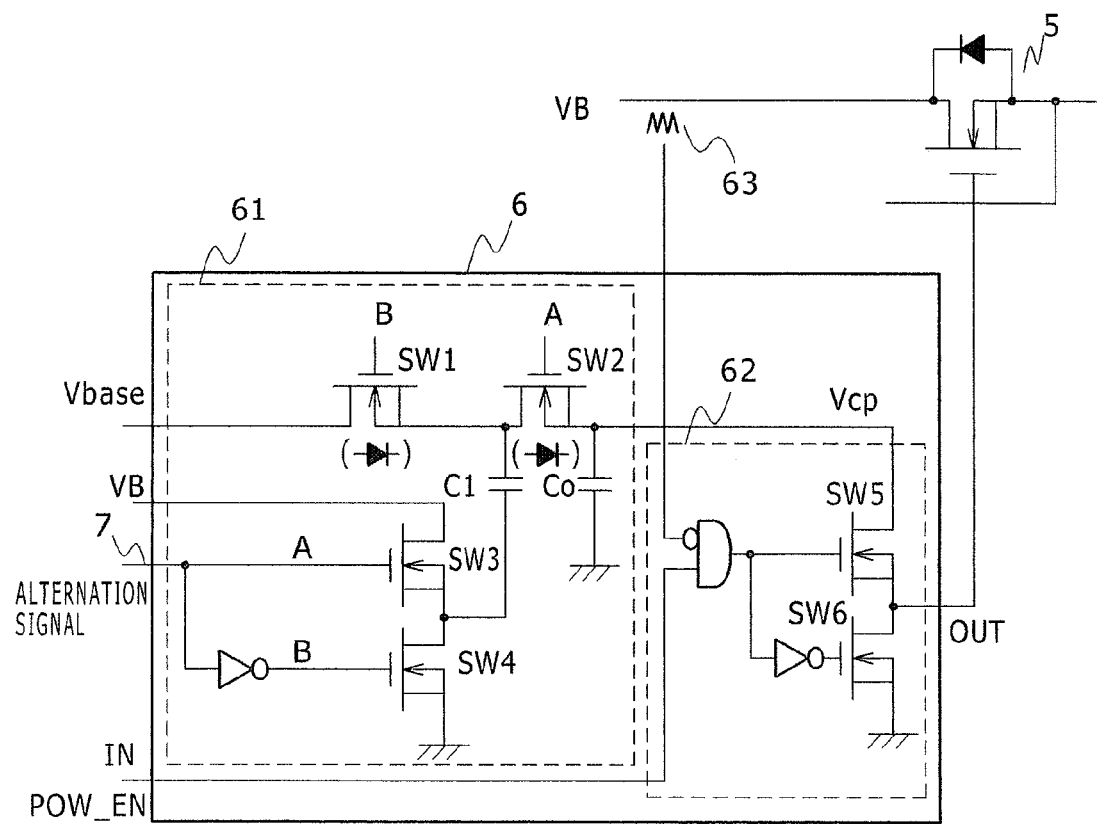
FIG. 33 is a diagram showing the structure of circuits surrounding a charge-pump pre-driver 6 in the power conversion apparatus 1000 according to a tenth embodiment.

FIG. 33 is a diagram showing the structure of circuits surrounding a charge-pump pre-driver 6 in the power conversion apparatus 1000 according to a tenth embodiment. In the structure shown in FIG. 33, an overcurrent detection circuit 63 included in the charge pump pre-driver 6 controls the fifth-group MOSFET 5 for cutting of all currents. When a flowing current exceeds a threshold value, the overcurrent detection circuit 63 detects that phenomenon and outputs a detection result to the pre-driver 62. Then, the pre-driver 62 stops the operation to drive the fifth-group MOSFET 5 in order to cut off all currents.

In accordance with the tenth embodiment, the microprocessor 100-1 and the microprocessor 100-2 detect an overcurrent and are capable of cutting off all currents before turning off POW_EN. Thus, it is possible to prevent the fifth-group MOSFET 5 from being burnt due to the overcurrent and avoid a cutting-off failure attributed to a burnt fifth-group MOSFET 5.

The overcurrent detection circuit 63 can be structured as the same circuit as the circuit for outputting the all-current detection signal 15 explained earlier in the description of the fifth embodiment or configured as another circuit. The circuit may have low accuracy even though its responsiveness needs to be high.

Normally, after the microprocessor 100-1 and the microprocessor 100-2 have converted the analog all-current detection signal 15 into a digital signal, software detects an overcurrent and it takes several microseconds to several tens of msec till the POW_EN signal is powered off. Meanwhile, it takes several tens of nsec for the overcurrent detection circuit 63 to detect an overcurrent and for hardware to power off the fifth-group MOSFET 5 subsequently. The amount of heat dissipated by the overcurrent in the mean time can be reduced to $1/100$ to $1/1000000$ so that it is possible to prevent the fifth-group MOSFET 5 from being burnt due to the overcurrent.

Figures 34, 35:
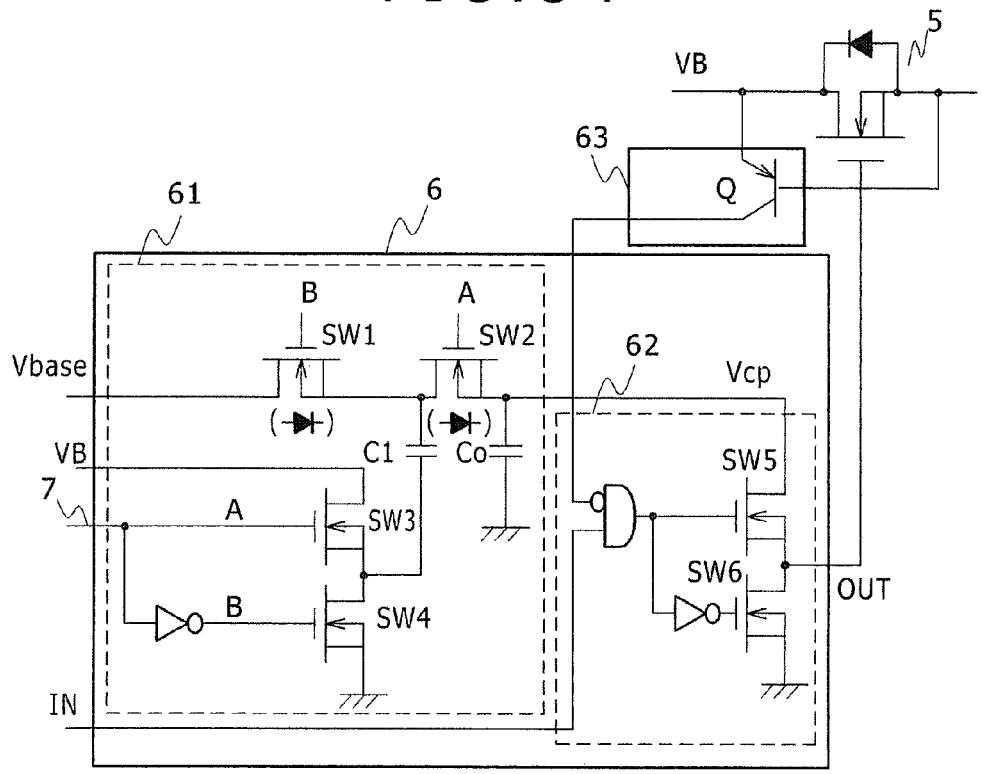
FIG. 34 is a diagram showing a typical structure including a circuit structure for detecting an electric potential difference between the drain of a MOSFET 5 and the source of the MOSFET 5 with the use of a PNP transistor Q.
FIG. 35 shows a table comparing the number of MOSFET which are required when a two-phase motor or a direct-current motor is driven.

FIG. 34 is a diagram showing a typical structure including a circuit structure, for detecting an electric potential difference between the drain of a MOSFET 5 and the source of the MOSFET 5 with the use of a PNP transistor Q. An electric potential difference proportional to the flowing current appears between the drain of a MOSFET 5 and the source of the MOSFET 5. When this electric potential difference exceeds an electric potential of a PN junction between the emitter of the PNP transistor Q and the base of the PNP transistor Q, the overcurrent detection circuit 63 detects the flowing current as an overcurrent. At this time, the pre-driver 62 stops the operation to drive the fifth-group MOSFET 5 in order to cut off all currents. By virtue of the typical structure shown in FIG. 34, the overcurrent detection circuit 63 can be implemented as a simple circuit.

The above description explains a driving circuit for a case in which the motor 8 is a three-phase motor. For a case in which the motor 8 is a two-phase motor or a DC motor, only one phase needs to be eliminated from the embodiments of the present invention.

The number of MOSFET required when the driven motor 8 is a two-phase motor or a DC motor are compared in a table shown in FIG. 35. In the same way as FIG. 17, the table compares the number of MOSFET required, as well as the number of MOSFETs serially connected for passing currents on current paths as on-resistance indexes.

The number of MOSFLETs required is expressed as the sum of "(the number of MOSFETs required for building a two-phase inverter or an H bridge) and (the number of additional MOSFETs required for implementing circuit structures)". The number of MOSFETs required for building a two-phase inverter or an H bridge is 4. The number of MOSFLETs serially connected is the number of MOSFETs through which a current flows on a current path having the power supply→the motor→the ground at the time of driving and on a current path including the ground→the motor→the power supply at the time of back flow.

Figure 36:
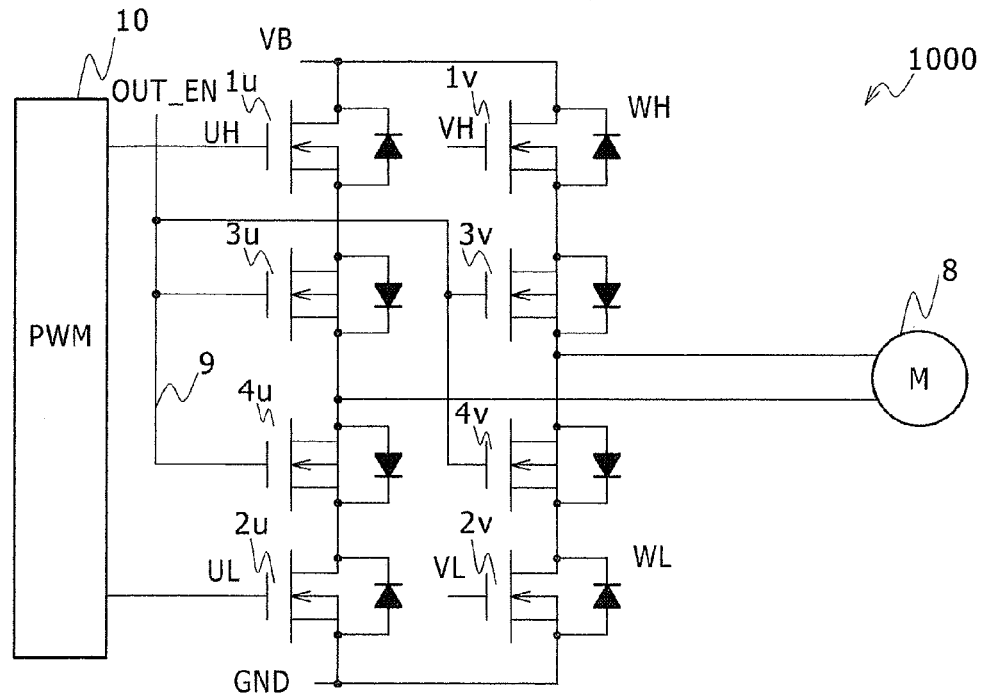
FIG. 36 is a diagram showing other circuits of the power conversion apparatus 1000 shown in FIG. 8.
Figure 37:
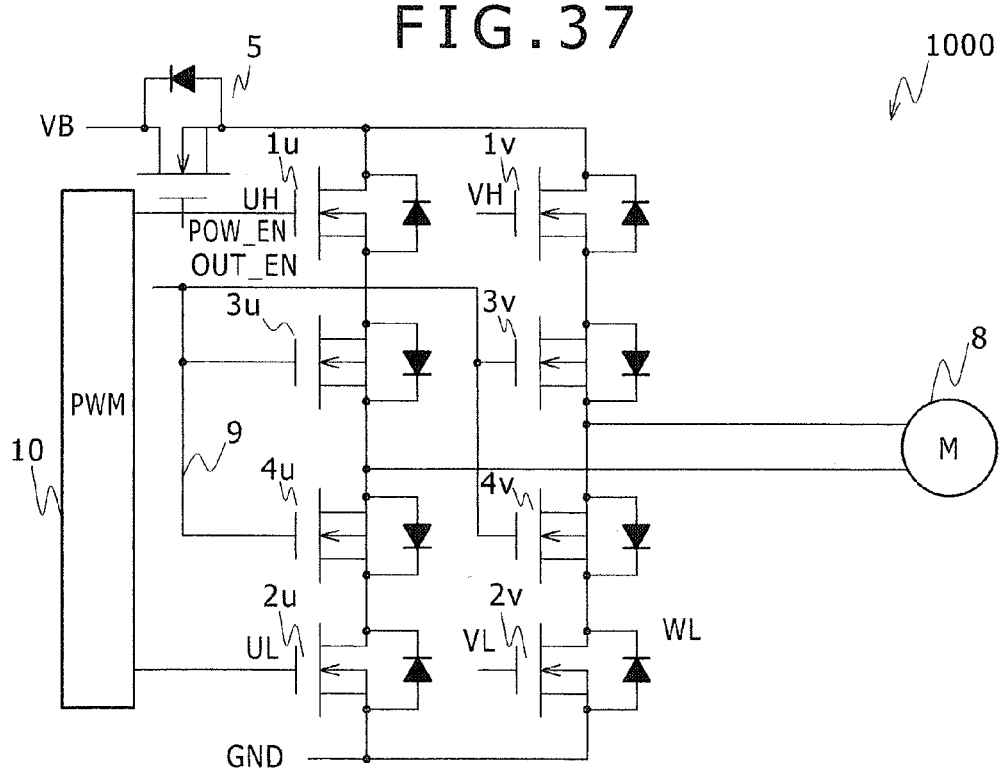
FIG. 37 is a diagram showing other circuits of the power conversion apparatus 1000 shown in FIG. 15.

A structure obtained by eliminating one phase from the structure shown in FIG. 2 and a structure shown in FIG. 36 (as a structure obtained by eliminating one phase from the structure shown in FIG. 8) provide the minimum of the number of MOSFLETs required. However, at the time of driving, the structure shown in FIG. 35 provides the minimum of the series connection counts for MOSFETs for passing currents on current paths. At the time of back flow, both the structure obtained by eliminating one phase from the structure shown in FIG. 2 and the structure shown in FIG. 36 provide the minimum value. Thus, in order to minimize the cost and loss and maximize the efficiency, it is obvious that the structure shown in FIG. 36 is desirable. By the same token, also for the all-current cutting-off function, the structure shown in FIG. 37 (a structure obtained by eliminating one phase from the structure shown in FIG. 15) is most excellent in terms of cost and loss (efficiency).

FIGS. 38 to 41 are diagrams showing embodiments obtained by inserting the third-group MOSFETs 3u to 3w or the fourth-group MOSFETs 4u to 4w into the neutral-point side of the motor.

The fourth-group MOSFET 4' is used for cutting off a current loop which is generated when the winding to the neutral point is short-circuited to GND. The third-group MOSFET 3' is used for cutting off a current loop which is generated when the winding to the neutral point is short-circuited to VB. If there is no possibility of such a short circuit to VB, the third-group MOSFET 3' is not required.

Figure 38:
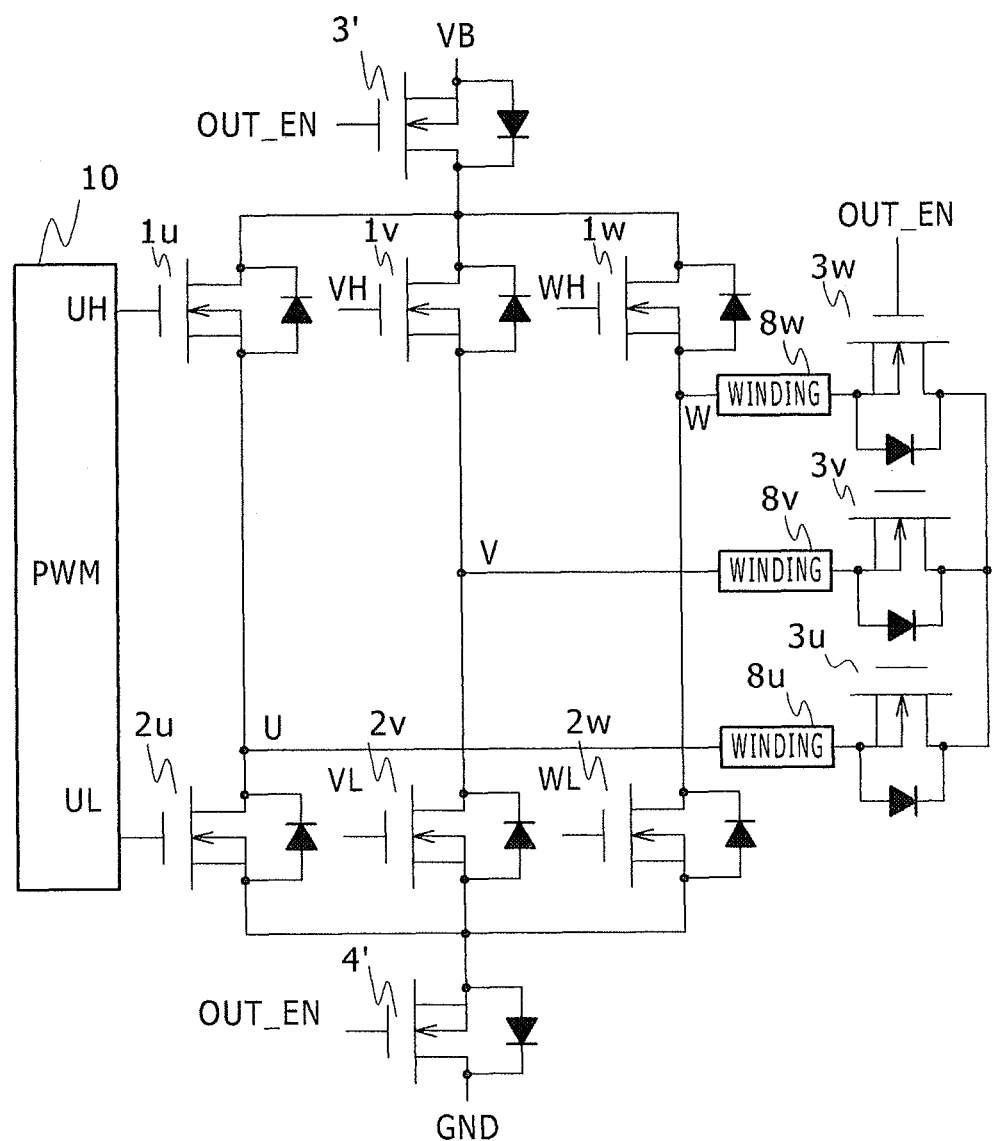
FIG. 38 is a diagram showing a circuit including a third-group MOSFET 3 added on a neutral-point side.

In the structure shown in FIG. 38, the third-group MOSFETs 3u to 3w are used for preventing the motor 8 from carrying out a regeneration braking operation after a regeneration current is flown from the motor 8 and are inserted into the neutral-point side. The regeneration current flows from the motor 8 when the first-group MOSFETs 1u to 1w or the second-group MOSFETs 2u to 2w in the three-phase inverter are short circuited in the same way as the embodiments shown in FIGS. 1 and 2.

Figure 40:
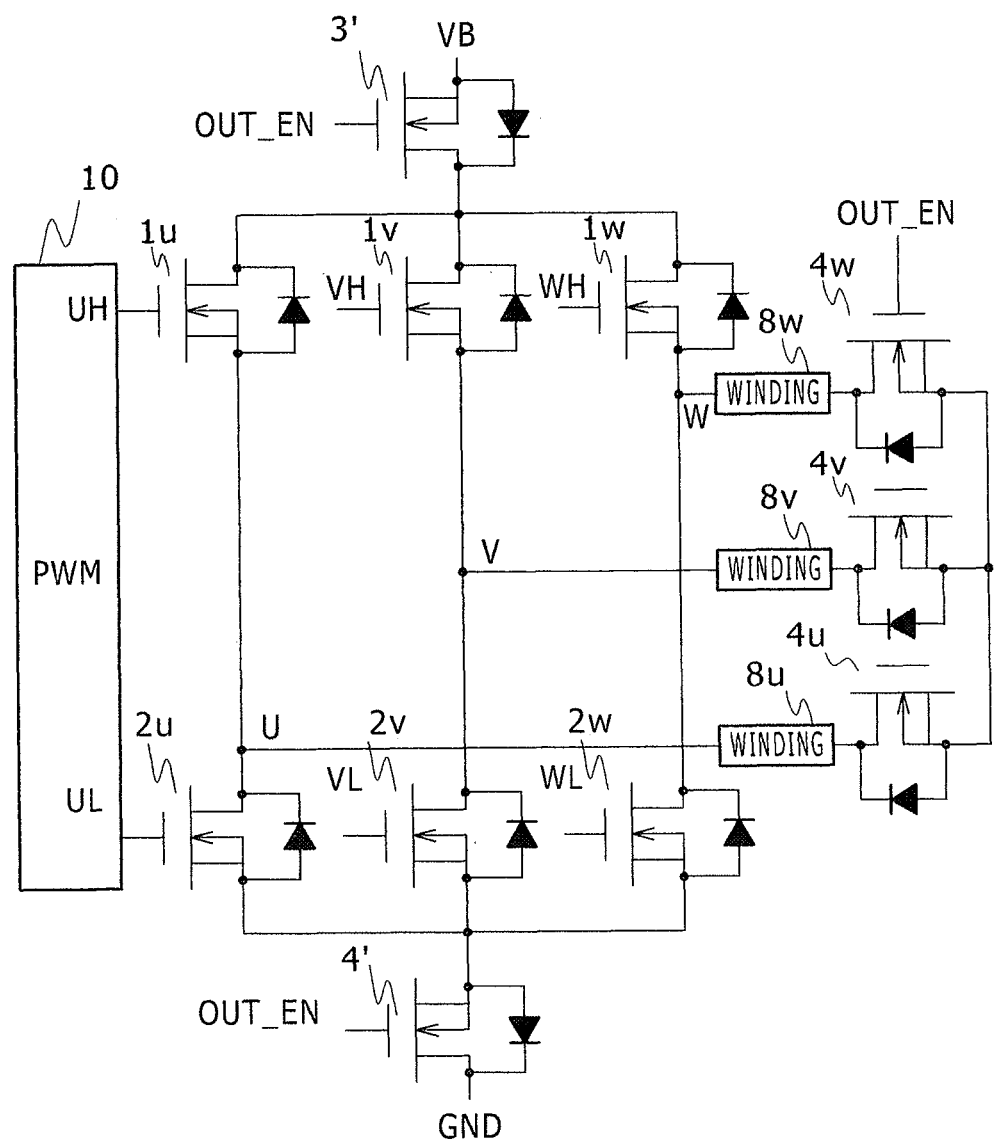
FIG. 40 is a diagram showing a circuit including a fourth-group MOSFET 4 added on a neutral-point side.

Also in the structure shown in FIG. 40, the fourth-group MOSFETs 4u to 4w are used for preventing the motor 8 from carrying out a regeneration braking operation after a regeneration current is flown from the motor 8 and are inserted into the neutral-point side in the same way as the structure shown in FIG. 38. The regeneration current flows from the motor 8 when the first-group MOSFETs 1u to 1w or the second-group MOSFETs 2u to 2w in the three-phase inverter are short circuited in the same way as the embodiment shown in FIG. 4.

Figure 39:
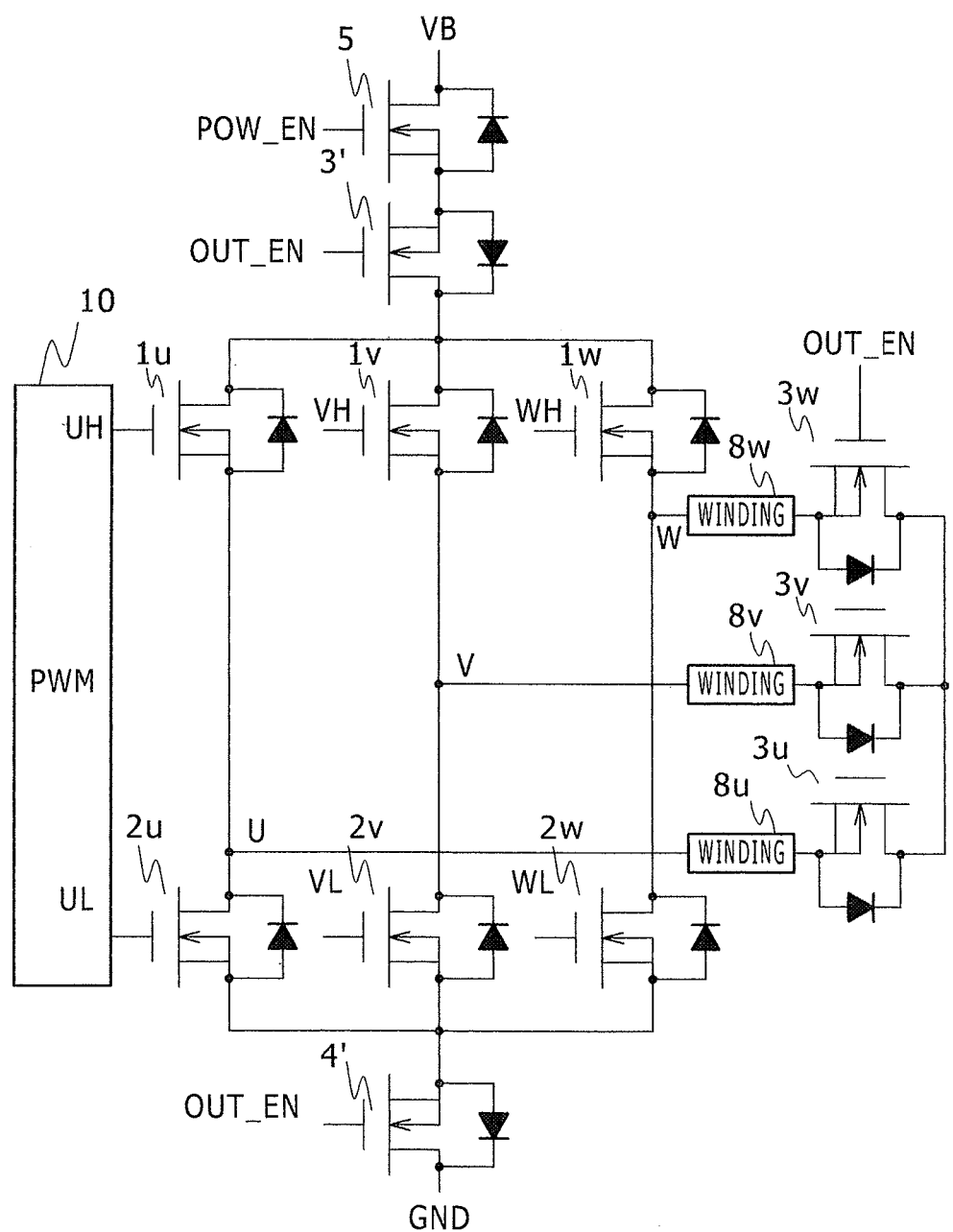
FIG. 39 is a diagram showing the structure of a circuit including an additional fifth-group MOSFET 5 for cutting off all currents in addition to the circuit shown in FIG. 38.
Figure 41:
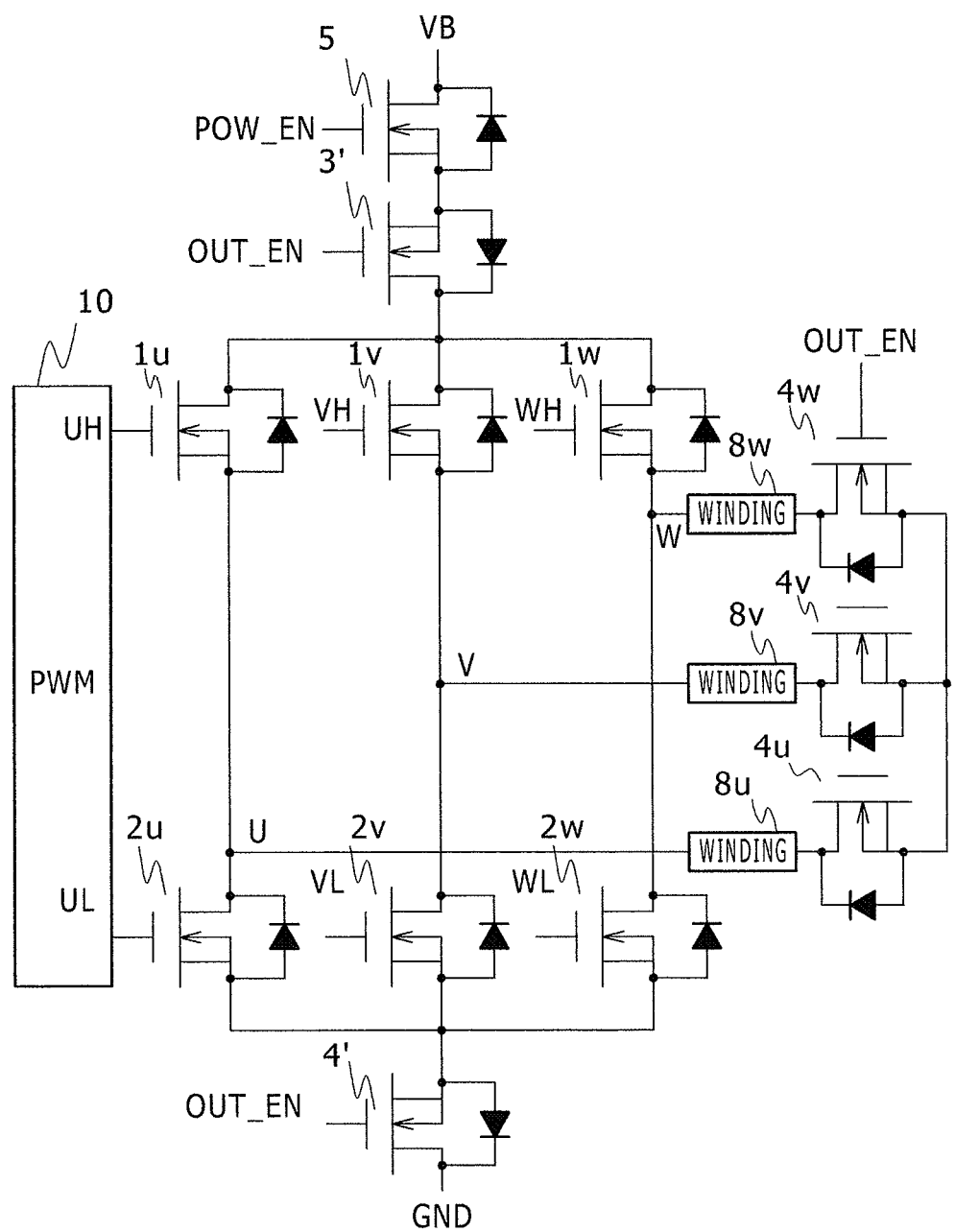
FIG. 41 is a diagram showing the structure of a circuit including an additional fifth-group MOSFET 5 for cutting off all currents in addition to the circuit shown in FIG. 40.

FIGS. 39 and 41 shows embodiments obtained by adding the fifth-group MOSFET 5 for cutting off all currents to embodiments shown in FIGS. 38 and 40, respectively. That is to say, one end of the motor winding is connected to the phase output of the power conversion apparatus whereas other ends of the motor winding are each connected to the neutral point through the fifth-group MOSFET 5. The fifth-group MOSFET 5 is connected in a direction in which a diode coupled in parallel to the fifth-group MOSFET 5 lets currents flow in the same direction from the motor to the neutral point.

The following description compares an embodiment having the third-group MOSFETs 3u to 3w or the fourth-group MOSFETs 4u to 4w inserted into the phase-output side of the three-phase inverter with an embodiment having the third-group MOSFETs 3u to 3w or the fourth-group MOSFETs 4u to 4w inserted into the neutral-point side. In a structure for preventing the motor from carrying out a regeneration braking operation in the event of an abnormality, the number of MOSFETs required by the latter is larger by a difference of one. In a structure having the all-current cutting-off function, the number of MOSFETs required by the latter is equal to the number of MOSFETs required by the former.

It is to be noted that the orientation of the third-group MOSFETs 3u to 3w or the fourth-group MOSFETs 4u to 4w can be any orientation. However, the orientations shown in FIGS. 38 and 39 are preferred because these orientations allow a common source electric potential and a common circuit for driving the fourth-group MOSFETs 4u to 4w to be used.

It is to be noted that the present invention is not limited to the aforementioned embodiments, but covers various modifications. While, for illustrative purposes, those embodiments have been described specifically, the present invention is not necessarily limited to the specific forms disclosed. Thus, partial replacement is possible between the components of a certain embodiment and the components of another. Likewise, certain components can be added to or removed from the embodiments disclosed.

For example, the above description explains a three-phase inverter used for driving a DC brushless motor or an AC synchronous motor in an embodiment. It is needless to say, however, the technology provided by the present invention can be applied to an H bridge used for driving a DC brushless motor.

Note also that some or all of the aforementioned components, functions, processors, and the like can be implemented by hardware such as an integrated circuit. Alternatively, those components, functions, and the like can be implemented by software as well. In the latter case, a processor can interpret and execute the programs designed to serve those functions. The programs, associated data tables, files, and the like can be stored on a stationary storage device such as a memory, a hard disk, and a solid state drive (SSD) or on a portable storage medium such as an integrated circuit card (ICC), an SD card, and a DVD.

REFERENCE NUMERALS

1: First-group MOSFET
1u to 1w: First-group MOSFETs
2: Second-group MOSFET
2u to 2w: Second-group MOSFETs
3: Third-group MOSFET
3u to 3w: Third-group MOSFETs
4: Fourth-group MOSFET
4u to 4w: Fourth-group MOSFETs
5: Fifth-group MOSFET
6: Charge-pump pre-driver
7: Alternation signal
8: Motor
10: PWM timer
100: Microprocessor
1000: Power conversion apparatus
2000: Electronic steering system
3000: Electric vehicle
4000: Electronic control throttle
5000: Regeneration brake

The invention claimed is:

1. A power conversion apparatus for converting power supplied from a power supply by use of a bridge circuit as a power conversion circuit and for outputting a phase-current from a phase output of a motor through a phase output line connecting to a phase output of the power conversion circuit, comprising:
  a first semiconductor switching device provided between a phase output of the power conversion circuit and the power supply, and constituting an upper arm of the power conversion circuit;
  a second semiconductor switching device is provided between the phase output of the power conversion apparatus and the ground, and constituting a lower arm of the power conversion circuit;
a third semiconductor switching device provided in series with the first semiconductor switching device, the third semiconductor switching device being provided in series between the phase output of the power conversion apparatus and the power supply; and
a fourth semiconductor switching device provided between the phase output of the motor and the phase output of the power conversion apparatus, wherein
the third semiconductor switching device is connected in a direction in which a current flows to the motor from the power supply through a diode coupled in parallel to the third semiconductor switching device,
the fourth semiconductor switching device is connected in a direction in which a current flows to the ground from the motor through a diode coupled in parallel to the fourth semiconductor switching device, and
the third semiconductor switching device and the fourth semiconductor switching device are connected in an orientation permitting a current flow through the diodes respectively coupled in parallel to the third semiconductor switching device and the fourth semiconductor switching device in a same direction relative to the phase output of the power conversion circuit.

2. A power conversion apparatus according to claim 1, wherein the third semiconductor switching device is structured as a semiconductor switching device of a booster circuit provided on a power supply side relative to the power conversion apparatus.

3. A power conversion apparatus according to claim 1, wherein:
the fourth semiconductor switching device is provided in series with the second semiconductor switching device, the fourth device being provided in series between the phase output of the motor and the ground,
the fourth semiconductor switching device being connected in a direction in which a current flows to the ground through a diode coupled in parallel to the fourth semiconductor switching device.

4. A power conversion apparatus according to claim 1, wherein
a fifth semiconductor switching device is connected in series with the third semiconductor switching device and in such an orientation that a diode coupled in parallel to the fifth semiconductor switching device cuts off a current flowing in a direction from the power supply to the power conversion apparatus.

5. A power conversion apparatus according to claim 4, wherein:
a motor winding has its one end connected to the phase output of the power conversion apparatus and its other ends each connected to a neutral point through the fifth semiconductor switching device, and
the fifth semiconductor switching device is connected in an orientation of letting a current flow through a diode coupled in parallel to the fifth semiconductor switching device in a same direction from the motor to the neutral point.

6. A power conversion apparatus according to claim 1, comprising
a control circuit for switching the third semiconductor switching device and the fourth semiconductor switching device to a power OFF state in an event of an abnormality generated in the power conversion apparatus.

7. A power conversion apparatus according to claim 1 wherein:
at least one of the semiconductor switching devices has a gate terminal controlled by a voltage of the power supply after the voltage is boosted by a booster circuit; and
the booster circuit operates in accordance with an alternation signal supplied to the booster circuit.

8. A power conversion apparatus according to claim 7, comprising
a microprocessor for controlling the first semiconductor switching device and the second semiconductor switching device, wherein
the microprocessor outputs the alternation signal.

9. A power conversion apparatus according to claim 7, comprising:
a first microprocessor for providing a first output signal for controlling the first semiconductor switching device and a second microprocessor for providing a second output signal for controlling the second semiconductor switching device; and
a comparison circuit electronically connected to the first and second microprocessors for comparing the first and second output signals before outputting a comparison result, wherein
the comparison circuit outputs the comparison result serving as the alternation signal.

10. A power conversion apparatus according to claim 1, wherein the semiconductor switching devices are a MOSFET.

11. A power conversion apparatus according to claim 1, wherein at least three of the semiconductor switching devices are connected in series between the power source and the ground.

12. An electronic steering system comprising:
a steering wheel;
a rotation shaft attached to the steering wheel;
a torque sensor attached to the rotation shaft;
a steering mechanism;
a microprocessor;
a power conversion apparatus according to claim 1; and
a motor, wherein:
the steering mechanism is subjected to a steering operation carried out by the rotation shaft;
the motor provides at least one of the steering mechanism and the rotation shaft with a supplementary steering force;
the microprocessor controls the power conversion apparatus on a basis of an output of the torque sensor; and
the power conversion apparatus drives the motor.

13. An electric vehicle comprising:
an accelerator position sensor for detecting a depression amount of an accelerator pedal being pressed;
a microprocessor;
a power conversion apparatus according to claim 1;
a motor; and
a vehicle wheel driven by the motor, wherein:
the microprocessor controls the power conversion apparatus on a basis of the output of the accelerator position sensor; and
the power conversion apparatus drives the motor.

14. An electronic control throttle comprising:
an accelerator position sensor for detecting a depression amount of an accelerator pedal being pressed;
a microprocessor;
a power conversion apparatus according to claim 1;
a motor;

a throttle valve driven by the motor;

a throttle position sensor for measuring an opening of the throttle valve; and a default position mechanism for using a brake to set the opening of the throttle valve at a predetermined opening when the motor is out of driving force, wherein:

the microprocessor controls the power conversion apparatus on a basis of the output of the accelerator-position sensor; and the power conversion apparatus drives the motor.

15. A power brake comprising:

a brake pedal position sensor for detecting a depression amount of a brake pedal being pressed;

a microprocessor;

a power conversion apparatus according to claim 1;

a motor;

a brake pad driven by the motor;

a thrust sensor for measuring a push amount of the brake pad being pushed to a rotor; and a default position mechanism for holding the brake pad at a position at which the brake pad is not being pushed to the rotor when the motor is out of driving force, wherein:

the microprocessor controls the power conversion apparatus on a basis of the output of the brake pedal position sensor; and the power conversion apparatus drives the motor.

16. A power conversion apparatus for converting power supplied from a power supply into a current for driving a motor by use of a plurality of semiconductor switching devices, wherein:

the semiconductor switching devices each have a diode coupled in parallel to the semiconductor switching devices, at least one of the diodes on a current path between the power supply and a ground being connected in a direction opposite to a direction in which other diodes on the current path between the power supply and the ground;

at least one of the diodes are connected in a direction opposite to the direction of the other diodes on a current path between a motor winding and the power supply and on a current path between a phase output of the motor and the ground;

the diodes are each coupled in parallel to each of the semiconductor switching devices, at least one of the diodes being connected in a direction opposite to a direction in which other diodes are oriented on a current path between the power supply and the ground and being coupled to a connection point coupled to a point; and the diodes are each coupled in parallel to each of the semiconductor switching devices, at least one of the diodes being connected in a direction opposite to a direction in which the other diodes are oriented on a current path between the motor winding and the power supply and on a current path between a phase output of the motor and the ground and being connected in series.

* * * * *